(12) United States Patent
Sawada et al.

(10) Patent No.: US 7,017,548 B2
(45) Date of Patent: Mar. 28, 2006

(54) ENGINE CONTROLLER

(75) Inventors: Yuichiro Sawada, Shizuoka (JP);
Hitoshi Hasegawa, Shizuoka (JP);
Michiyasu Takahashi, Shizuoka (JP)

(73) Assignee: Yamaha Hatsudoki Kabushiki Kaisha, Iwata (JP)

( * ) Notice: Subject to any disclaimer, the term of this patent is extended or adjusted under 35 U.S.C. 154(b) by 0 days.

(21) Appl. No.: 10/497,280

(22) PCT Filed: Dec. 2, 2002

(86) PCT No.: PCT/JP02/12603

§ 371 (c)(1),
(2), (4) Date: May 28, 2004

(87) PCT Pub. No.: WO03/046372

PCT Pub. Date: Jun. 5, 2003

(65) Prior Publication Data

US 2004/0255902 A1    Dec. 23, 2004

(30) Foreign Application Priority Data

Nov. 30, 2001  (JP)  ............................. 2001-367543
Jul. 22, 2002  (JP)  ............................. 2002-212902

(51) Int. Cl.
*F02D 41/16* (2006.01)

(52) U.S. Cl. ............................. 123/339.11; 123/339.21; 123/339.22

(58) Field of Classification Search ........... 123/339.11, 123/339.19–339.22
See application file for complete search history.

(56) References Cited

U.S. PATENT DOCUMENTS

| 4,328,775 | A  | * | 5/1982  | Ironside ................. | 123/339.11 |
| 4,506,639 | A  | * | 3/1985  | Murakami et al. ...... | 123/339.11 |
| 4,887,570 | A  | * | 12/1989 | Meicher ................ | 123/339.15 |
| 5,727,522 | A  | * | 3/1998  | Otani et al. ............ | 123/339.11 |
| 6,170,322 | B1 | * | 1/2001  | Yamazaki et al. ......... | 73/117.3 |
| 6,276,131 | B1 | * | 8/2001  | Ueno et al. ............ | 123/339.11 |

FOREIGN PATENT DOCUMENTS

| JP | 59-136546 | 8/1984 |
| JP | 61-94291  | 6/1986 |
| JP | 02-161153 | 6/1990 |

(Continued)

*Primary Examiner*—Tony M. Argenbright
(74) *Attorney, Agent, or Firm*—Hogan & Hartson, L.L.P.

(57) ABSTRACT

An unstable idling state immediately after engine start is stabilized. The difference between a target idling engine speed corresponding to the cooling water temperature and an actual engine speed is integrated. The ignition timing is changed toward advance or retard while using a value obtained by multiplying the integration value of the engine speed difference with a gain, as an ignition timing changing amount. Immediately after engine start, the gain is made relatively large to rapidly increase engine speed. When the engine speed approaches the target engine speed, the gain is set to a smaller usual gain, and, in a change to the same advancing or retarding side, a change to an ignition timing in the same side is suppressed using a smaller advancing or retarding gain. In a throttle-off state, an ignition timing corresponding to the cooling water temperature is set to rapidly reduce engine speed.

11 Claims, 21 Drawing Sheets

FOREIGN PATENT DOCUMENTS

| | | |
|---|---|---|
| JP | 03-63741 | 6/1991 |
| JP | 4-353267 | 12/1992 |
| JP | 05-10192 | 1/1993 |
| JP | 07-34952 | 2/1995 |
| JP | 7-224706 | 8/1995 |
| JP | 09-228885 | 9/1997 |
| JP | 10-227252 | 8/1998 |
| JP | 11-36960 | 2/1999 |
| JP | 2000-170582 | 6/2000 |
| JP | 2000-265894 | 9/2000 |

* cited by examiner

| ATMOSPHERIC PRESSURE | ..... | 70 | 80 | 90 | 100 | ..... |
|---|---|---|---|---|---|---|
| INTAKE PRESSURE IDLING PREDETERMINED VALUE | ..... | 30 | 34 | 37 | 40 | ..... |

ENGINE CONTROLLER

TECHNICAL FIELD

The present invention relates to an engine controller which controls an engine, and more particularly to an apparatus suitable for controlling an engine having a fuel injection apparatus which injects fuel.

BACKGROUND ART

Recently, as a fuel injection apparatus which is called an injector is more widely used, the fuel injection timing, the amount of injected fuel, i.e., the air-fuel ratio, and the like can be more easily controlled, so that a higher output power, smaller fuel consumption, exhaust gas purification, and the like can be enhanced. With respect to the fuel injection timing, particularly, the state of an intake valve in a strict sense, or the phase state of a camshaft in a usual sense is detected, and fuel is usually injected in accordance with the detected state. However, a so-called cam sensor for detecting the phase state of a camshaft is expensive. In a two-wheeled vehicle, particularly, a cam sensor cannot be often employed because of a problem in that the size of a cylinder head is increased. For example, JP-A-10-227252 proposes an engine controller in which the phase state of a crankshaft and the intake pressure are detected and the stroke state of a cylinder is detected from them. When this conventional technique is used, the stroke state can be detected without detecting the phase of a camshaft, and hence the fuel injection timing and the like can be controlled in accordance with the stroke state.

When an engine is electronic-controlled as described above, it is possible to control also the ignition timing. The ignition timing affects the torque of an engine When the ignition timing is set to be: slightly advanced from the compression top dead center, the highest torque is generated. When the ignition timing is changed from it toward advance or retard, the torque is reduced. Actually, however, a specific ignition timing controlling technique for, in, for example, a state immediately after start of rotation of an engine, adequately controlling the unstable engine speed in an idling state is not proposed.

The invention is developed in order to solve the problems discussed above, and has an objective of providing an engine controller which can adequately control the engine speed in an idling state immediately after engine start or the like.

DISCLOSURE OF INVENTION

In order to solve the problems, the engine controller of the present invention comprises: crankshaft phase detecting means for detecting a phase of a crankshaft; intake pressure detecting means for detecting an intake pressure of an intake passage of an engine; stroke detecting means for detecting a stroke of the engine on the basis of the phase of the crankshaft detected by the crankshaft phase detecting means, and the intake pressure detected by the intake pressure detecting means; and engine controlling means for controlling an operation state of the engine on the basis of the stroke of the engine detected by the stroke detecting means, and the engine controlling means comprises: engine speed detecting means for detecting a speed of the engine; idling detecting means for detecting an idling state of the engine; target engine speed setting means for, when the idling state of the engine is detected by the idling detecting means, setting a target engine speed; and idling ignition timing setting means for, when the idling state of the engine is detected by the idling detecting means, setting an ignition timing in accordance with a difference between the target engine speed set by the target engine speed setting means and the engine speed detected by the engine speed detecting means.

The invention is further characterized in that, when the ignition timing is changed to one of an advancing side and a retarding side, the idling ignition timing setting means avoids continuation of a change of the ignition timing to a same side.

The invention is further characterized in that, the idling ignition timing setting means sets the ignition timing by multiplying an integration value of the difference between the target engine speed set by the target engine speed setting means and the engine speed detected by the engine speed detecting means, with a predetermined gain.

The invention is further characterized in that, when the ignition timing is changed to one of the advancing side and the retarding side, the idling ignition timing setting means sets the ignition timing change setting gain for the same side to a smaller value, the ignition timing change setting gain being multiplied with the integration value of the difference between the target engine speed set by the target engine speed setting means and the engine speed detected by the engine speed detecting means.

The invention is further characterized in that, immediately after start of rotation of the engine, the idling ignition timing setting means sets the gain to a larger value, the gain being multiplied with the integration value of the difference between the target engine speed set by the target engine speed setting means and the engine speed detected by the engine speed detecting means.

The invention further comprises engine temperature detecting means for detecting a temperature of the engine, and the idling ignition timing setting means sets the ignition timing at a state change of the engine from a state other than the idling state to the idling state, on the basis of the engine temperature detected by the engine temperature detecting means.

The invention further comprises engine temperature detecting means for detecting a temperature of the engine, and the idling ignition timing setting means sets upper and lower limits of the ignition timing on the basis of the engine temperature detected by the engine temperature detecting means, and restricts the ignition timing by the upper and lower limits.

The invention is further characterized in that, the idling ignition timing setting means sets the upper and lower limits of the ignition timing so that a width between the upper and lower limits is narrower as the engine temperature detected by the engine temperature detecting means is higher.

The invention further comprises atmospheric pressure detecting means for detecting an atmospheric pressure, and the idling detecting means sets a predetermined value of the intake pressure for detecting the idling state, on the basis of the atmospheric pressure detected by the atmospheric pressure detecting means, and, when the intake pressure detected by the intake pressure detecting means is equal to or lower than the predetermined value for detecting the idling state when the phase of the crankshaft detected by the crankshaft phase detecting means has a predetermined value, detects the idling state of the engine.

The invention is further characterized in that, the idling detecting means sets the predetermined value of the intake pressure for detecting the idling state to be larger as the atmospheric pressure detected by the atmospheric pressure detecting means is higher.

The invention is further characterized in that, the atmospheric pressure detecting means detects the atmospheric pressure on the basis of the intake pressure detected by the intake pressure detecting means.

The invention further comprises a centrifugal clutch between the engine and a transmission, and, when the engine speed detected by the engine speed detecting means is equal to or lower than an engagement speed of the centrifugal clutch, the idling detecting means detects the idling state of the engine.

BEST MODE FOR CARRYING OUT THE INVENTION

Hereinafter, embodiments of the invention will be described.

Figure 1:
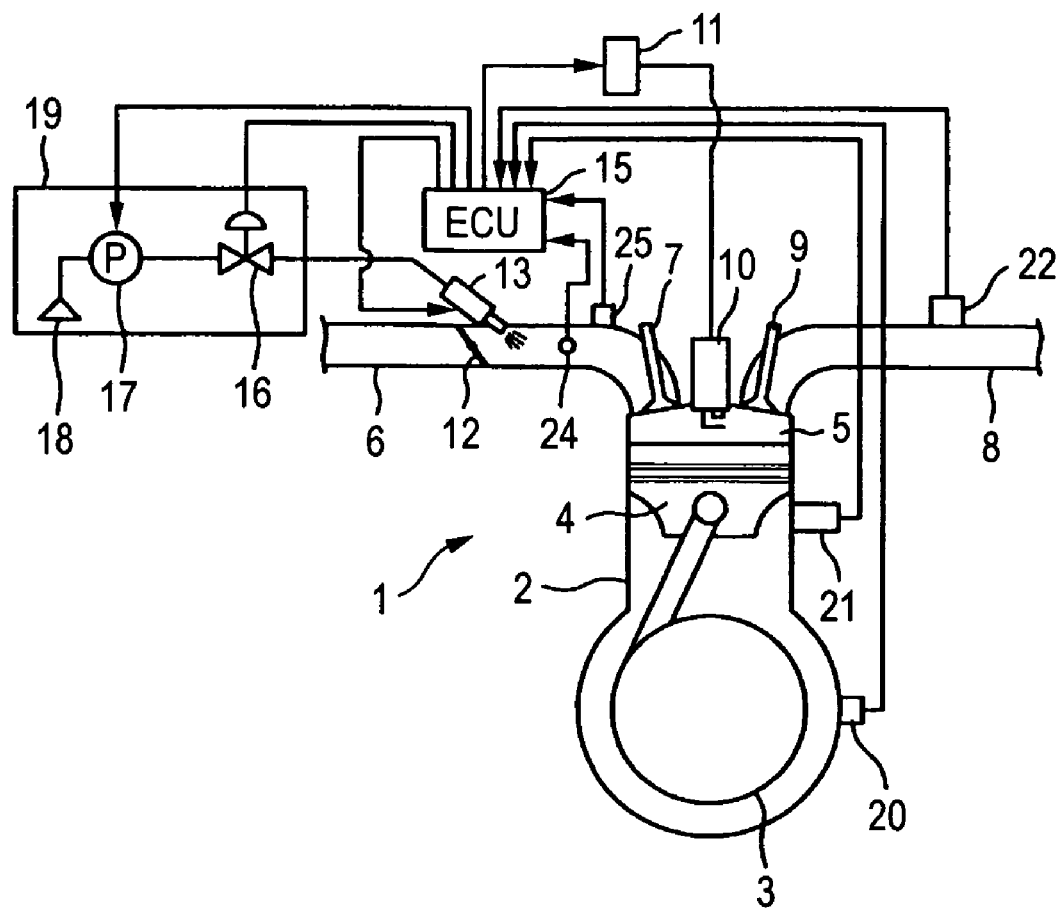
FIG. 1 is a diagram showing the configuration of an engine for a motorcycle and a control apparatus for the engine.

FIG. 1 is a diagram showing the configuration of, for example, an engine for a motorcycle and an example of a control apparatus for the engine. The engine 1 is a single-cylinder four-cycle engine of a relatively small displacement, and comprises a cylinder body 2, a crankshaft 3, a piston 4, a combustion chamber 5, an intake pipe (intake passage) 6, an intake valve 7, an exhaust pipe 8, an exhaust valve 9, a spark plug 10, and an ignition coil 11. A throttle valve 12 which is opened or closed in accordance with the degree of an accelerator operation is disposed in the intake pipe 6, and an injector 13 serving as a fuel injection apparatus is disposed in the intake pipe 6 downstream from the throttle valve 12. The injector 13 is connected to a filter 18 which is disposed in a fuel tank 19, a fuel pump 17, and a pressure control valve 16. A centrifugal clutch is interposed between the engine 1 and a transmission.

The operation state of the engine 1 is controlled by an engine control unit 15. As control inputs of the engine control unit 15, i.e., means for detecting the operation state of the engine 1, the following sensors are disposed: a crank angle sensor 20 which detects the rotation angle or the phase of the crankshaft 3; a cooling water temperature sensor 21 which detects the temperature of the cylinder body 2 or the cooling water temperature, i.e., the temperature of the engine body; an exhaust air-fuel ratio sensor 22 which detects the air-fuel ratio in the exhaust pipe 8; an intake pressure sensor 24 which detects the intake pressure in the intake pipe 6; and an intake temperature sensor 25 which detects the temperature in the intake pipe 6, i.e., the intake temperature. The engine control unit 15 receives detection signals of these sensors, and outputs a control signal to the fuel pump 17, the pressure control valve 16, the injector 13, and the ignition coil 11.

Figure 2A:
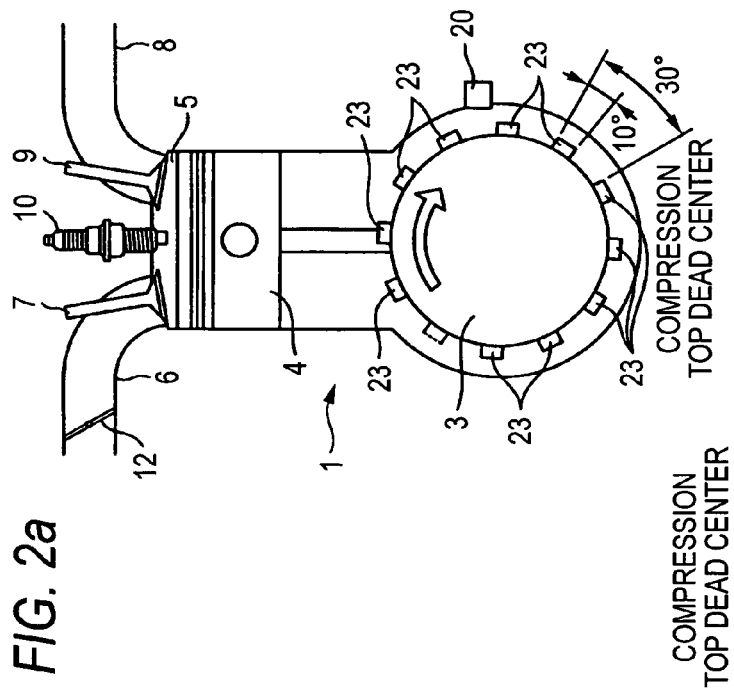
FIGS. 2a and 2b are diagrams illustrating the principle of transmission of a crank pulse in the engine of FIG. 1.

The principle of a crank angle signal which is output from the crank angle sensor 20 will be described. In the embodiment, as shown in FIG. 2a, a plurality of teeth 23 are protruded at substantially equal intervals from the outer circumference of the crankshaft 3, and the crank angle sensor 20 such as a magnetic sensor detects the approach of each tooth, applies an appropriate electric process, and then transmits pulse signals. The pitch of the teeth 23 in the circumferential direction is set to 30° in terms of the phase (rotation angle) of the crankshaft 3, and the width of each of the teeth 23 in the circumferential direction is set to 10° in terms of the phase (rotation angle) of the crankshaft 3. In one place only, however, the pitch is not set as described above, but set twice the pitch of the other teeth 23. In the place, as indicated by the two-dot chain line in FIG. 2a, no tooth is formed in a portion where a tooth should originally exist, or special setting is applied. This portion corresponds to an unequal interval. Hereinafter, this portion is often referred to as toothless portion.

Figure 2B:
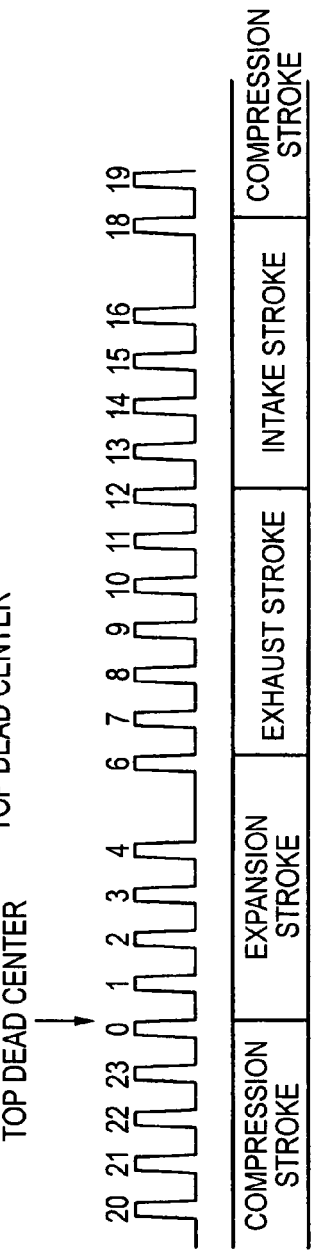

When the crankshaft 3 is rotated at a constant speed, therefore, the pulse signal train of the teeth 23 appears as shown in FIG. 2b. FIG. 2a shows the state at the compression top dead center (also the state at the exhaust top dead center is identical in form). As shown in the figure, the pulse signals are numbered in the sequence that the pulse signal immediately before the compression top dead center is indicated by "0", the next pulse by "1", and the next next pulse by "2", and the last number is set to "4". The portion subsequent to the tooth 23 corresponding to the pulse signal of "4" is the toothless portion. Therefore, it is assumed that a tooth exists in the portion, and an extra count for one tooth is performed so that the pulse signal for the next tooth 23 is numbered "6". When this numbering process is repeated, the toothless portion approaches the portion subsequent to the pulse signal of "16", and therefore an extra count for one tooth is performed in the same manner as described above so that the pulse signal for the next tooth 23 is numbered "18". When the crankshaft 3 makes two rotations, all the cycles of the four strokes are completed. When the numbering process has proceeded to "23", therefore, the pulse signal for the subsequent tooth 23 is again numbered "0". In principle, the portion immediately after the pulse signal of the "0"-numbered tooth 23 ought to correspond to the compression top dead center. In this way, the detected pulse signal train, or each single pulse signal is defined as a crank pulse. When stroke detection is performed on the basis of the crank pulse as described later, a crank timing can be detected. Alternatively, the teeth 23 may be disposed on the outer periphery of a member which is rotated in synchronization with the crankshaft 3. The alternative is strictly identical with the configuration described above.

Figure 3:
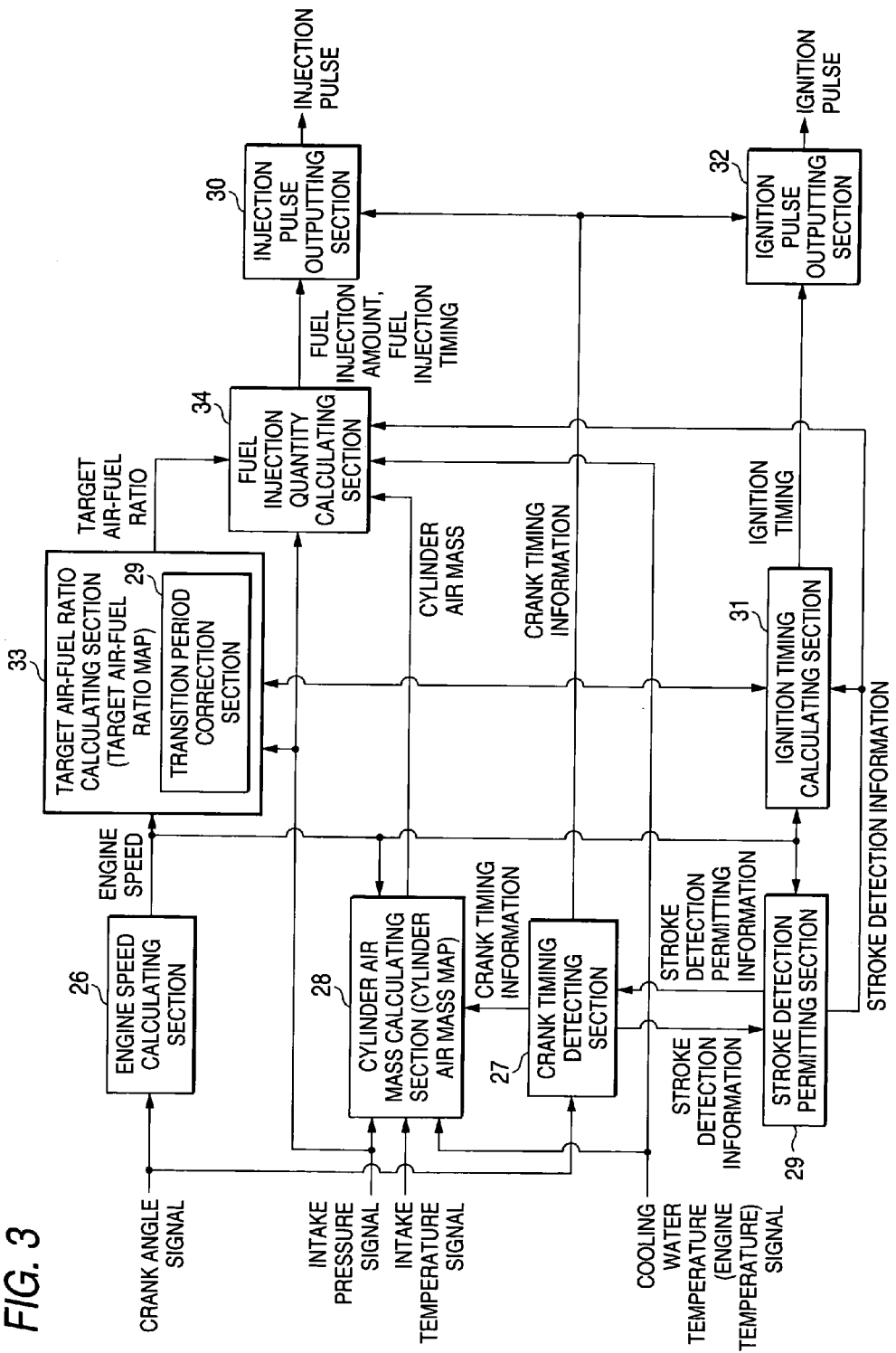
FIG. 3 is a block diagram showing an embodiment of the engine controller of the invention.

By contrast, the engine control unit 15 is configured by a microcomputer which is not shown, etc. FIG. 3 is a block diagram showing an embodiment of an engine control computing process which is performed by the microcomputer in the engine control unit 15. The computing process comprises: an engine speed calculating section 26 which calculates the engine speed from the crank angle signal; a crank timing detecting section 27 which detects crank timing information, i.e., the stroke state from the crank angle signal and the intake pressure signal; a stroke detection permitting section 29 which reads the engine speed calculated by the engine speed calculating section 26, which outputs stroke detection permission information to the crank timing detecting section 27, and which fetches and outputs stroke detection information produced by the crank timing detecting section 27; a cylinder air mass calculating section 28 which reads the crank timing information detected by the crank timing detecting section 27, and which calculates a cylinder air mass (intake air mass) from the intake temperature signal, the cooling water temperature (engine temperature) signal, the intake pressure signal, and the engine speed calculated by the engine speed calculating section 26; a target air-fuel ratio calculating section 33 which calculates a target air-fuel ratio from the engine speed calculated by the engine speed calculating section 26, and the intake pressure signal; a fuel injection amount calculating section 34 which calculates a fuel injection amount and a fuel injection timing from the target air-fuel ratio calculated by the target air-fuel ratio calculating section 33, the intake pressure signal, the cylinder air mass calculated by the cylinder air mass calculating section 28, the stroke detection information output from the stroke detection permitting section 29, and the cooling water temperature signal; an injection pulse outputting section 30 which reads the crank timing information detected by the crank timing detecting section 27, and which outputs toward the injector 13 an injection pulse corresponding to the fuel injection amount and the fuel injection timing calculated by the fuel injection amount calculating section 34; an ignition timing calculating section 31 which calculates an ignition timing from the engine speed calculated by the engine speed calculating section 26, the target air-fuel ratio set by the target air-fuel ratio calculating section 33, and the stroke detection information output from the stroke detection permitting section 29; and an ignition pulse outputting section 32 which reads the crank timing information detected by the crank timing detecting section 27, and which outputs toward the ignition coil 11 an ignition pulse corresponding to the ignition timing set by the ignition timing calculating section 31.

From a time change rate of the crank angle signal, the engine speed calculating section 26 calculates the rotation speed of the crankshaft serving as an output shaft of the engine, as the engine speed. Specifically, an instantaneous value of the engine speed which is obtained by dividing the phase between the adjacent teeth 23 by a time required for detecting the corresponding crank pulse, and an average value of the engine speed consisting of the moving average value are calculated.

Figure 4:
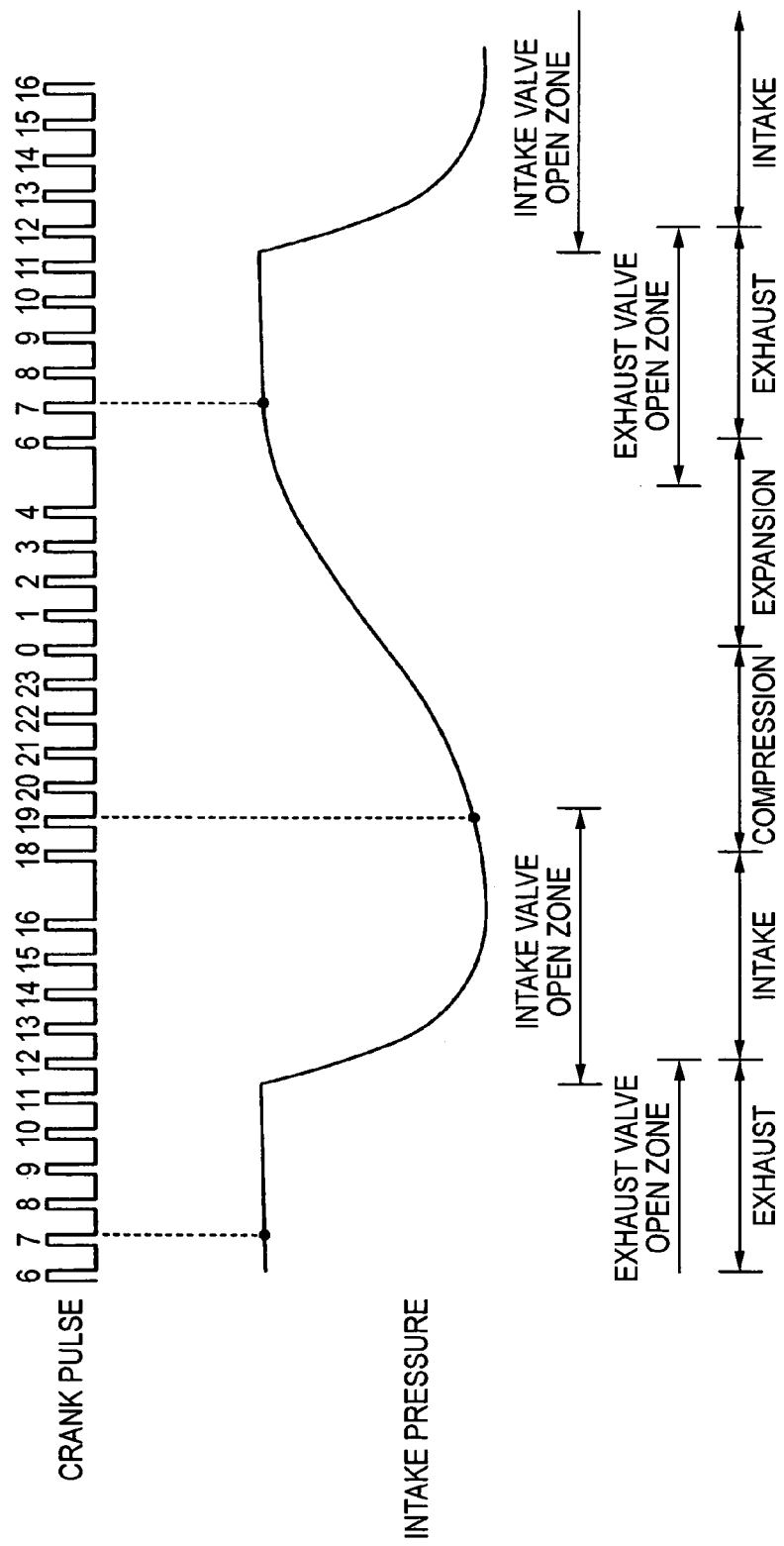
FIG. 4 is a diagram illustrating detection of a stroke state from the phase of a crankshaft and the intake pressure.

The crank timing detecting section 27 is configured in a similar manner as the stroke judging apparatus disclosed in JP-A-10-227252 described above. As shown in FIG. 4, for example, the stroke state of each cylinder is detected, and the detected state is output as the crank timing information. In a four-cycle engine, namely, a crankshaft and a camshaft continue to be rotated at a predetermined phase difference. When the crank pulse is read as shown in FIG. 4, for example, crank pulse "9" or "21" which is a fourth pulse counted from the above-mentioned toothless portion is in either of the exhaust stroke or the compression stroke. In the exhaust stroke, as well known, the exhaust valve is opened, the intake valve is closed, and hence the intake pressure is high. In an early stage of the compression stroke, the intake valve remains to be opened and hence the intake pressure is low, or, even when the intake valve is closed, the intake pressure is lowered in the preceding intake stroke. Therefore, crank pulse "21" which is at a timing of a low intake pressure indicates that the cylinder is in the compression stroke, and a timing immediately after crank pulse "0" is obtained corresponds to the compression top dead center. When one of the stroke states is detected in this way, the stroke is interpolated with the rotation speed of the crankshaft, so that the present stroke state can be detected more finely.

Figure 5:
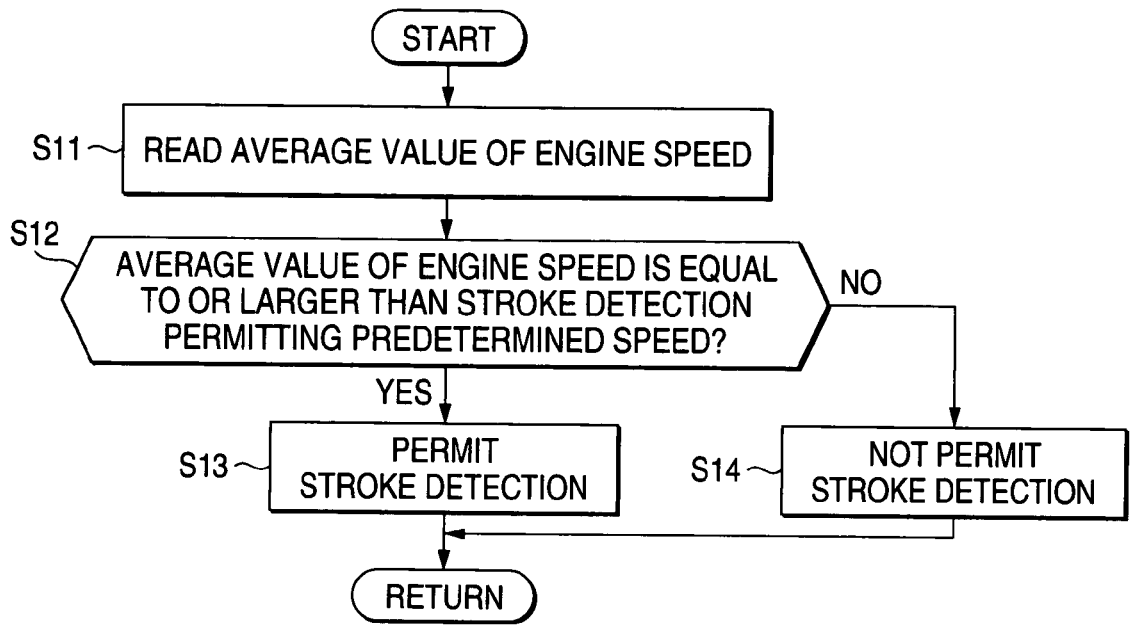
FIG. 5 is a flowchart showing a computing process which is performed in a stroke detection permitting section of FIG. 3.

The stroke detection permitting section 29 outputs stroke detection permission information for the crank timing detecting section 27 in accordance with a computing process shown in FIG. 5. As described above, detection of a stroke from the crank pulse requires at least two rotations of the crankshaft. During this period, the crank pulse including the toothless portion must be stabilized. In a single-cylinder engine of a relatively small displacement as in the embodiment, however, the rotation state of the engine is not stabilized in a starting process or so-called cranking. Therefore, the rotation state of the engine is judged by the computing process of FIG. 5, and stroke detection is permitted. The computing process of FIG. 5 is executed with using, for example, an input of the crank pulse as a trigger. Although a step for communication is not particularly disposed in the flowchart, information which is obtained as a result of the computing process is updated and stored at any time into a storage apparatus, and information and programs which are necessary for the computing process are read out at any time from the storage apparatus.

In the computing process, the average value of the engine speed calculated by the engine speed calculating section 26 is first read in step S11.

Then, the control proceeds to step S12 to judge whether or not the average value of the engine speed which is read in step S1 is equal to or larger than a preset stroke detection permitting predetermined speed that is equal to or larger than a rotation speed corresponding to the initial explosion. If the average value of the engine speed is equal to or larger than the stroke detection permitting predetermined speed, the control proceeds to step S13. If not, the control proceeds to step S14.

In step S13, information indicative of permitting of stroke detection is output, and the control then returns to a main program.

In step S14, information indicative of disabling of stroke detection is output, and the control then returns to the main program.

According to the computing process, stroke detection is permitted after the average value of the engine speed becomes equal to or larger than the stroke detection permitting predetermined rotation speed that is equal to or larger than at least the speed corresponding to the initial explosion. Therefore, the crank pulse is stabilized, and correct stroke detection can be performed.

Figure 6:
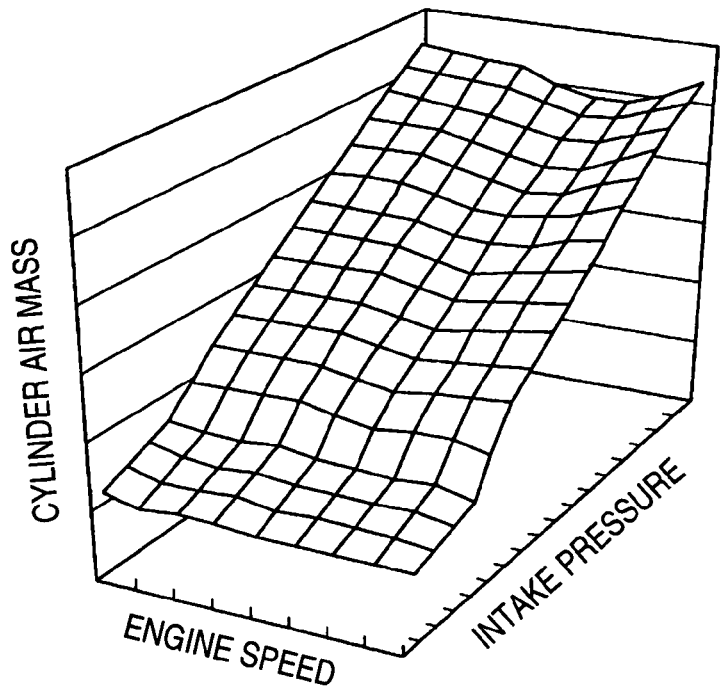
FIG. 6 is a map for calculating a cylinder air mass stored in a cylinder air mass calculating section.

As shown in FIG. 6, the cylinder air mass calculating section 28 has a three-dimensional map for calculating the cylinder air mass from the intake pressure signal and the engine speed calculated by the engine speed calculating section 26. For example, the three-dimensional map of the cylinder air mass requires only measurement of the cylinder air mass when the intake pressure is changed while rotating the engine at a predetermined speed, and such measurement can be conducted by a relatively simple experiment. Therefore, the map can be easily produced. When there is a sophisticated engine simulator, the map may be produced with using the simulator. Since the cylinder air mass is changed depending on the temperature of the engine, the mass may be corrected with using the cooling water temperature (engine temperature) signal.

Figure 7:
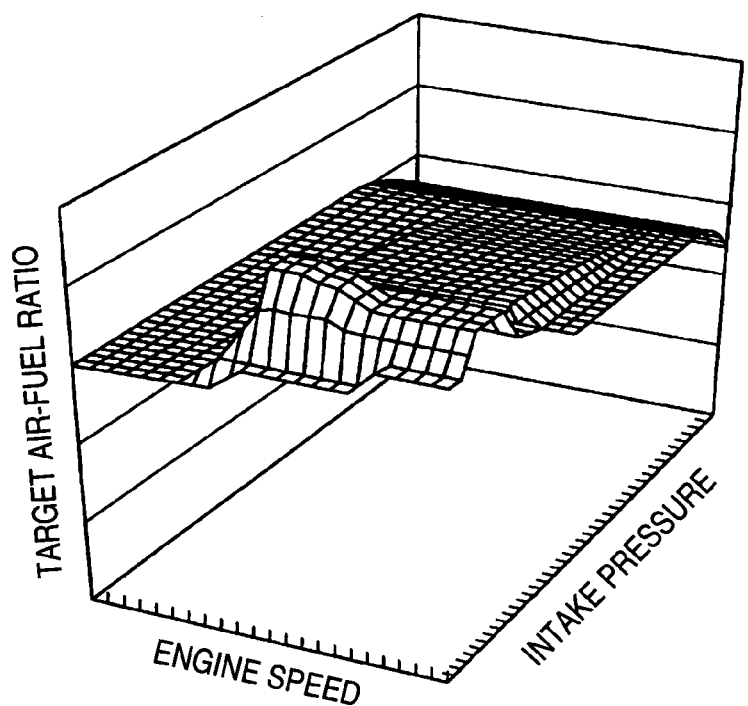
FIG. 7 is a map for calculating a target air-fuel ratio stored in a target air-fuel ratio calculating section.

As shown in FIG. 7, the target air-fuel ratio calculating section 33 has a three-dimensional map for calculating the target air-fuel ratio from the intake pressure signal and the engine speed calculated by the engine speed calculating section 26. The three-dimensional map can be theoretically set to some extent. The air-fuel ratio usually correlates with the torque. As the air-fuel ratio is smaller or the fuel is larger and the air is smaller, the torque is larger, and the efficiency is lower. By contrast, as the air-fuel ratio is larger or the fuel is smaller and the air is larger, the torque is smaller, and the efficiency is higher. A state of a small air-fuel ratio is called rich, and that of a large air-fuel ratio is called lean. The leanest state is at an air-fuel ratio which is called a so-called ideal air-fuel ratio or a stoichiometric ratio, and at which gasoline completely burns, i.e., an air-fuel ratio of 14.7.

The engine speed is one of indices indicating the operation state of the engine. Usually, in the high engine speed side, the air-fuel ratio is set to be large, and, in the low engine speed side, the ratio is set to be small. This is conducted in order to enhance the responsiveness of the torque in the low engine speed side, and to enhance the responsiveness of the rotation state in the high engine speed side. The intake pressure is one of indices indicating the engine load state such as the throttle opening. Usually, in a state where the engine load is large, or the throttle opening is large and the intake pressure is high, the air-fuel ratio is set to be small, and, in a state where the engine load is small, or the throttle opening is small and the intake pressure is low, the air-fuel ratio is set to be large. This is conducted in order to place emphasis on the torque in a state where the engine load is large, and to place emphasis on the efficiency in a state where the engine load is small.

As described above, the target air-fuel ratio is a numerical value from which physical meanings can be easily grasped. In accordance with the required output characteristics of the engine, therefore, the target air-fuel ratio can be set to some extent. It is a matter of course that tuning can be conducted in accordance with the output characteristics of an actual vehicle.

Figure 8:
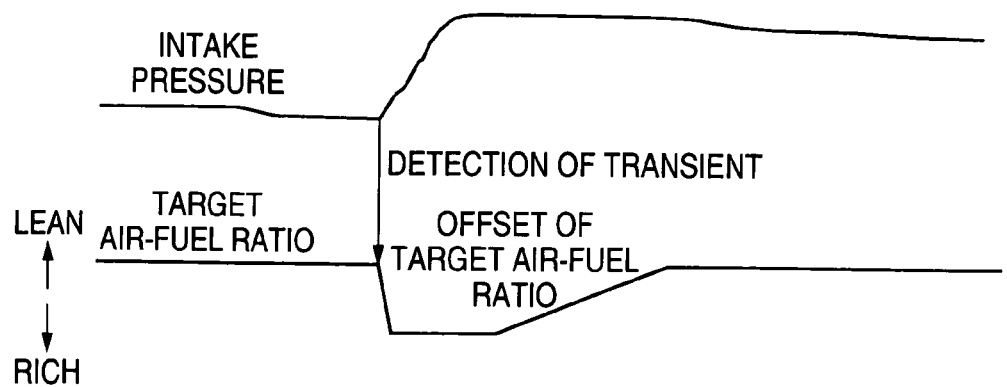
FIG. 8 is a view illustrating the operation of a transient correcting section.

The target air-fuel ratio calculating section 33 has a transient correcting section 29 which detects transient of the operation state of the engine, specifically, the acceleration state or the deceleration state, from the intake pressure signal, and which corrects the target air-fuel ratio in accordance with the detected transient. As shown in FIG. 8, for example, the intake pressure can be deemed as a resulting phenomenon of a throttle operation. Therefore, it will be see that, when the intake pressure is raised, the throttle is opened and acceleration is requested, or the acceleration state is set. When the acceleration state is detected, for example, the target air-fuel ratio is temporarily set to the rich side in accordance with the detected state, and then returned to the original target air-fuel ratio. The return to the target air-fuel ratio may be realized by a known method such as that in which the weighting coefficient of a weighted average value of the air-fuel ratio which is set to the rich side in transient, and the original target air-fuel ratio is gradually changed. By contrast, when the deceleration state is detected, the target air-fuel ratio may be set to be leaner than the original target air-fuel ratio so as to place emphasis on the efficiency.

Figure 9:
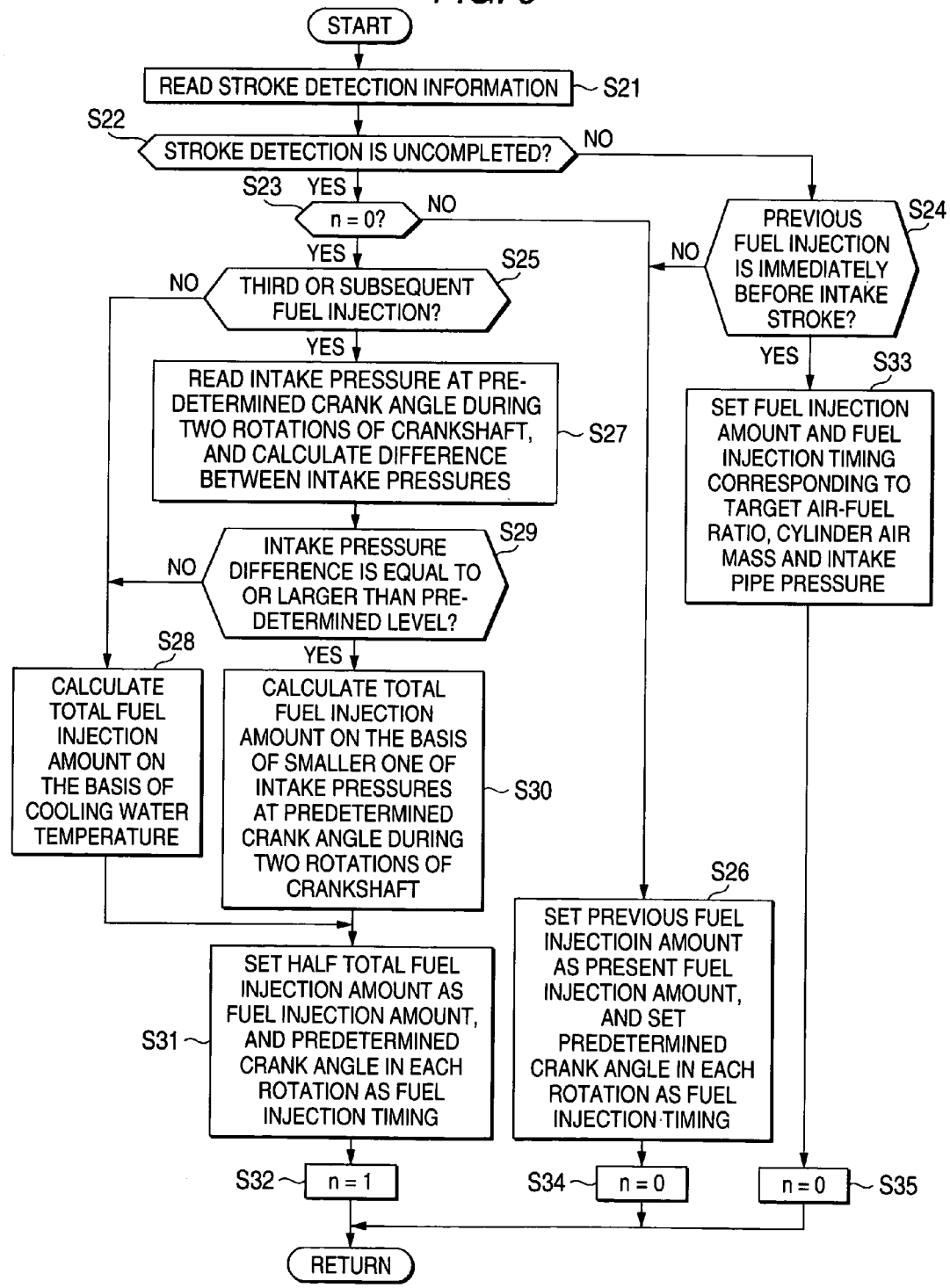
FIG. 9 is a flowchart showing a computing process which is performed in a fuel injection amount calculating section of FIG. 3.

The fuel injection amount calculating section 34 calculates the fuel injection amount and the fuel injection timing in engine start and usual operation, in accordance with a computing process shown in FIG. 9. The computing process of FIG. 9 is executed with using, for example, an input of the crank pulse as a trigger. Although a step for communication is not particularly disposed in the flowchart, information which is obtained as a result of the computing process is updated and stored at any time into the storage apparatus, and information and programs which are necessary for the computing process are read out at any time from the storage apparatus.

In the computing process, the stroke detection information output from the stroke detection permitting section 29 is first read in step S21.

Then, the control proceeds to step S22 to judge whether the stroke detection by the crank timing detecting section 27 is uncompleted or not. If the stroke detection is uncompleted, the control proceeds to step S23. If not, the control proceeds to step S24.

In step S23, it is judged whether a fuel injection number counter n is "0" or not. If the fuel injection number counter n is "0", the control proceeds to step S25. If not, the control proceeds to step S26.

In step S25, it is judged whether the next fuel injection is third or subsequent fuel injection counted from the beginning of engine start or not. If the next fuel injection is third or subsequent fuel injection, the control proceeds to step S27. If not, the control proceeds to step S28.

In step S27, the intake pressure at a preset predetermined crank angle during two rotations of the crankshaft, in the embodiment, at crank pulse "6" or "8" in FIGS. 2 and 4 is read from, for example, an intake pressure storage section which is not shown, and the difference between the intake pressures is calculated. Then, the control proceeds to step S29.

In step S29, it is judged whether or not the intake pressure difference calculated in step S28 is equal to or larger than a predetermined value by which the stroke can be identified to some extent. If the intake pressure difference is equal to or larger than the predetermined value, the control proceeds to step S30. If not, the control proceeds to step S28.

In step S30, the total fuel injection amount is calculated on the basis of the smaller one of the intake pressures at the predetermined crank angle during two rotations of the crankshaft which are read in step S27. Then, the control proceeds to step S31.

By contrast, in step S28, the cooling water temperature, i.e., the engine temperature is read, and the total fuel injection amount corresponding to the cooling water temperature is calculated, so that, for example, the total fuel injection amount is made larger as the cooling water temperature is lower. Thereafter, the control proceeds to step S31. The total fuel injection amount which is calculated in step S28 or step S30 means a fuel injection amount that is originally requested to be injected once in each cycle, or two rotations of the crankshaft, and before the intake stroke. When the stroke is already detected and the fuel injection amount corresponding to the cooling water temperature is injected once before the intake stroke, therefore, the engine adequately rotates in accordance with the cooling water temperature, i.e., the engine temperature.

In step S31, a half of the total fuel injection amount which is set in step S30 is set as a present fuel injection amount, and a predetermined crank angle in each rotation, i.e., one rotation of the crankshaft, or, in the embodiment, the timing of the falling edge of crank pulse "10" or "22" in FIGS. 2 and 4 is set as the fuel injection timing. Then, the control proceeds to step S32.

In step S32, the fuel injection number counter is set to "1" and the control then returns to the main program.

On the other hand, in step S24, it is judged whether the previous fuel injection is immediately before the intake stroke or not. If the previous fuel injection is immediately before the intake stroke, the control proceeds to step S33. If not, the control proceeds to step S26.

In step S26, the previous fuel injection amount is set as the present fuel injection amount, and, in the same manner as step S31, a predetermined crank angle in each rotation, i.e., one rotation of the crankshaft is set as the fuel injection timing. The control then proceeds to step S34.

In step S34, the fuel injection number counter is set to "0" and the control then returns to the main program.

In step S33, the fuel injection amount and the fuel injection timing in usual operation corresponding to the target air-fuel ratio, the cylinder air mass, and the intake pressure are set, and the control then proceeds to step S35. Specifically, for example, the cylinder air mass calculated by the cylinder air mass calculating section 28 is divided by the target air-fuel ratio calculated by the target air-fuel ratio calculating section 33, whereby the necessary cylinder fuel mass can be obtained. When the obtained mass is multiplied with, for example, the flow characteristic of the injector 13, it is possible to obtain a fuel injection time. From the time, the fuel injection amount and the fuel injection timing can be calculated.

In step S34, the fuel injection number counter is set to "0" and the control then returns to the main program.

In the computing process, when the stroke detection by the crank timing detecting section 27 is uncompleted, a half of the total fuel injection amount which is to be injected once in each cycle before the intake stroke to permit the engine to adequately rotate is once injected in each rotation of the crankshaft at the predetermined crank angle. As a result, as described later, there is the possibility that, in engine start, only a half of necessary fuel is sucked in an initial intake stroke after start of cranking. When the ignition is performed at or in the vicinity of the compression top dead center, however, explosion which may be weak can be surely attained, and the engine can be started. Of course, when necessary fuel is sucked in an initial intake stroke after start of cranking, or when an amount corresponding to two injections of fuel which is injected once for each rotation of the crankshaft can be sucked, a sufficient explosive power can be obtained, and the engine can be surely started.

Even in the case where the stroke is detected, when the previous fuel injection is not immediately before the intake stroke or, for example, before the exhaust stroke, only a half of the necessary fuel injection .amount is injected. Therefore, the fuel injection amount same as the previous one is again injected, whereby necessary fuel is sucked in the next intake stroke so that the engine can be operated while obtaining a sufficient explosive power.

In the case where the stroke detection is uncompleted, the intake pressure at the preset predetermined crank angle during two rotations of the crankshaft, specificaly, at crank pulse "6" or "8" in FIGS. 2 and 4, i.e., the intake pressure in the intake stroke or the expansion stroke is read, and the difference between the intake pressures is calculated. As described above, when the throttle valve is not suddenly opened by a large degree, there is a corresponding pressure difference between the intake pressures of the intake stroke and the expansion stroke. When the calculated intake pressure difference is equal to or larger than the predetermined value at which the stroke can be detected, therefore, the smaller one of the intake pressures is deemed as the intake pressure of the intake stroke, and the total fuel injection amount is set in accordance with the intake pressure which corresponds to the throttle opening to some extent, whereby rotation increase of the engine corresponding to the throttle opening can be attained.

By contrast, when the intake pressure difference at the predetermined crank angle during two rotations of the crankshaft is smaller than the predetermined value, or when fuel is injected immediately after the beginning of engine start, the total fuel injection amount corresponding to the cooling water temperature, i.e., the engine temperature is set, whereby rotation of the engine can be surely started at least against friction.

Figure 10:
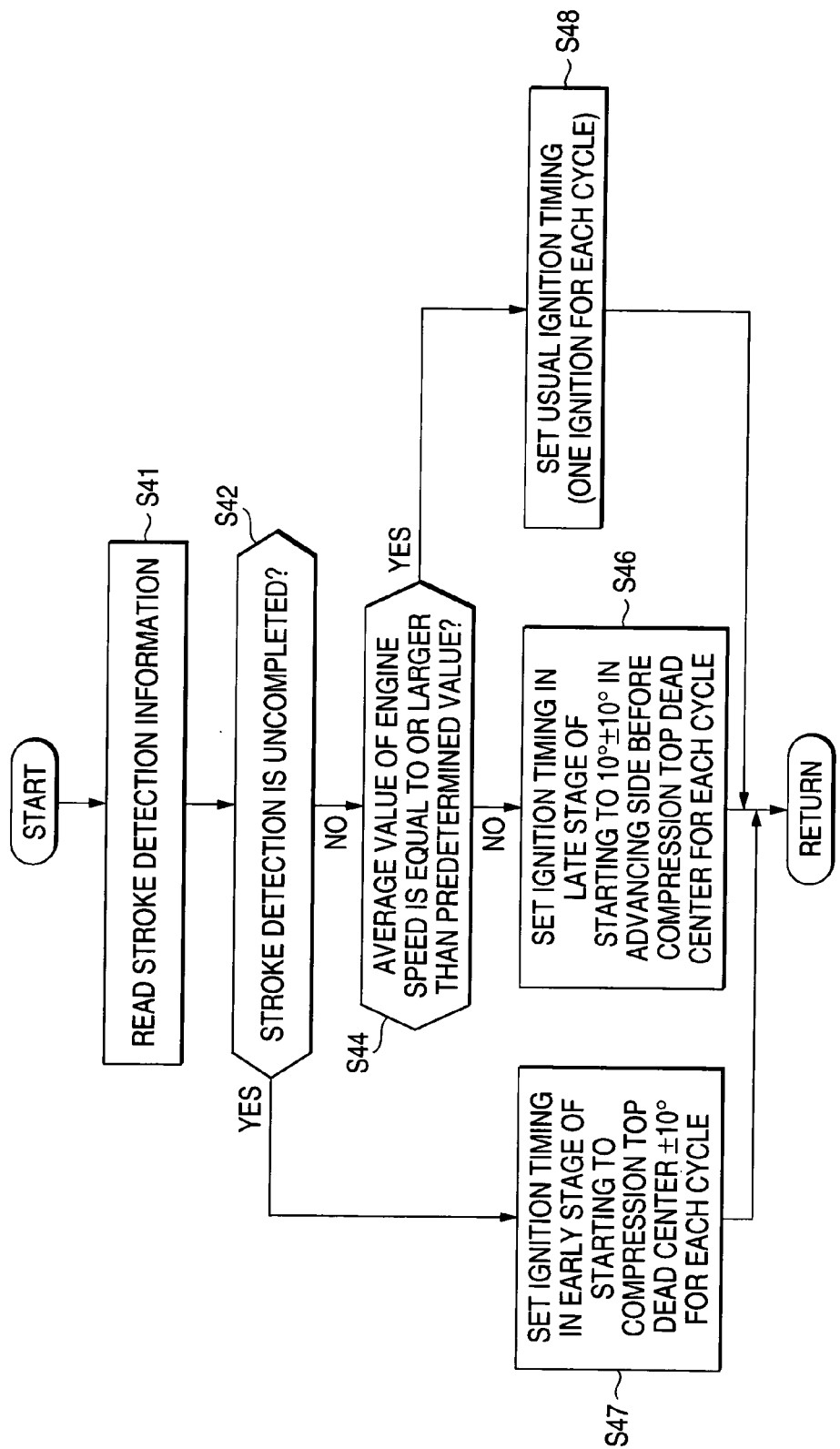
FIG. 10 is a flowchart showing a computing process which is performed in an ignition timing calculating section of FIG. 3.

In accordance with the computing process shown in FIG. 10, the ignition timing calculating section 31 calculates and sets the ignition timing in engine start and usual operation (including a timing immediately after engine start). The computing process of FIG. 10 is executed with using an input of the crank pulse as a trigger. Although a step for communication is not particularly disposed in the flowchart, information which is obtained as a result of the computing process is updated and stored at any time into the storage apparatus, and information and programs which are necessary for the computing process are read out from the storage apparatus.

In the computing process, the stroke detection information output from the stroke detection permitting section 29 is first read in step S41.

Then, the control proceeds to step S42 to judge whether the stroke detection by the crank timing detecting section 27 is uncompleted or not. If the stroke detection is uncompleted, the control proceeds to step S47. If not, the control proceeds to step S44.

In step S47, this timing is deemed as that which, in engine start or the like, is before an explosive power due to initial explosion after start of cranking is obtained, and at which the engine speed is low and unstable. The ignition timing in an early stage of starting in each rotation of the crankshaft is set to the top dead center (in either of compression and exhaust), i.e., the timing of the falling edge of crank pulse "0" or "12" in FIG. 2 or 4± the crankshaft rotation angle of 10°, and the control then returns to the main program. In the above, "± the crankshaft rotation angle of 10°" means consideration of the electrical or mechanical responsiveness. Actually, the ignition is performed at the same time with the falling edge of crank pulse "0" or "12" in FIG. 2 or 4.

In step S44, it is judged whether the average value of the engine speed is equal to or larger than a predetermined value or not. If the average value of the engine speed is equal to or larger than the predetermined value, the control proceeds to step S48. If not, the control proceeds to step S46.

Figure 11:
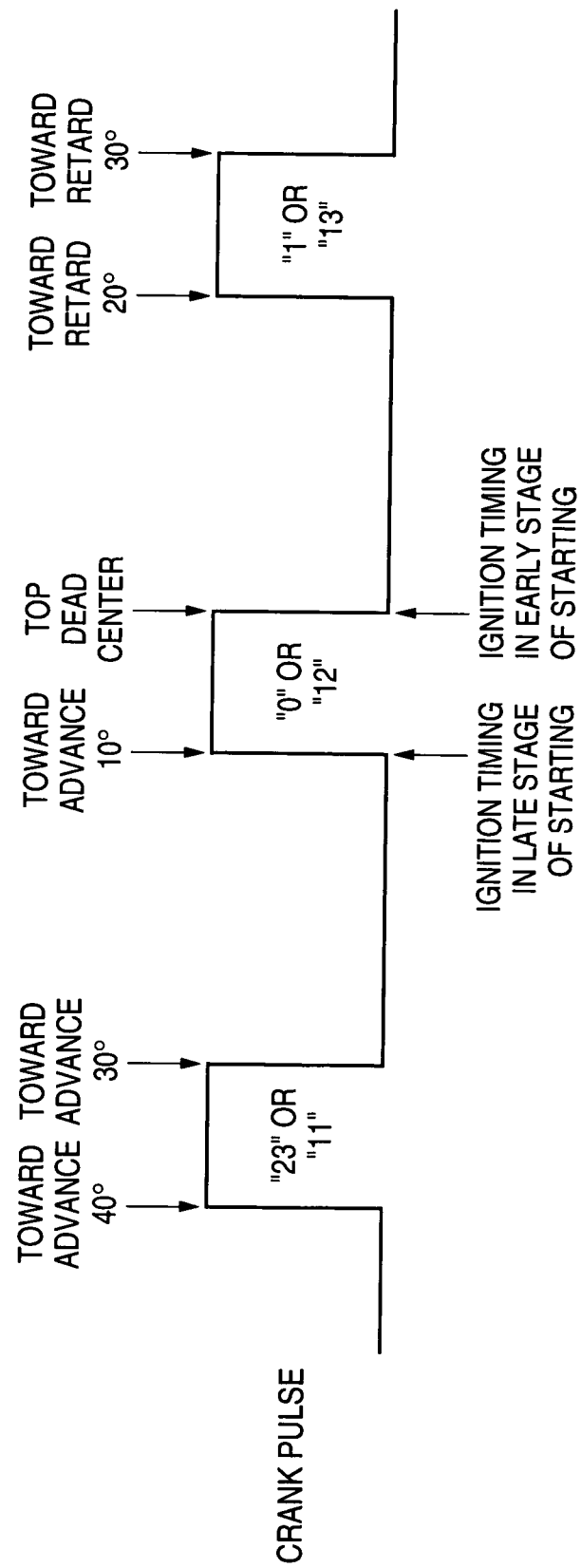
FIG. 11 is a view illustrating an ignition timing which is set in FIG. 10.

In step S46, this timing is deemed as that which, in engine start or the like, is after an explosive power due to initial explosion is obtained, and at which the engine speed is high to some extent (but the engine speed is not stabilized). The ignition timing in a late stage of starting in each rotation of the crankshaft is set to a timing which is advanced by 10° from the compression top dead center, i.e., the timing of the rising edge of crank pulse "0" in FIG. 3 or 11 ± the crankshaft rotation angle of 10°, and the control then returns to the main program. In the above, "± the crankshaft rotation angle of 10°" means consideration of the electrical or mechanical responsiveness. Actually, the ignition is performed at the same time with the rising edge of crank pulse "0" or "12" in FIG. 2 or 4.

In step S48, usual ignition timing setting is performed once for each stroke cycle in accordance with computing processes of FIGS. 14 to 16 described later, and the control then returns to the main program.

In the computing process, at start of cranking before the initial explosion in which the stroke detection is uncompleted, or in an early stage of starting, in addition to the fuel injection in each rotation of the crankshaft, setting the vicinity of the top dead center in each rotation of the crankshaft as an ignition timing is performed in order to surely start rotation of the engine, thereby preventing the engine from reversely rotating. Also after the stroke is detected, until when the engine speed becomes equal to or larger than a predetermined value, the vicinity of a timing which is advanced by 10° from the compression top dead center at which a relatively high torque is generated is set as the ignition timing in a late stage of starting, whereby the engine speed is stabilized to a relatively higher level.

As described above, in the embodiment, the cylinder air mass is calculated from the intake pressure and the engine operation state in accordance with the three-dimensional map of the cylinder air mass which is previously stored, the target air-fuel ratio is calculated from the intake pressure and the engine operation state in accordance with the map of the target air-fuel ratio which is previously stored, and the cylinder air mass is divided by the target air-fuel ratio, whereby the fuel injection amount can be calculated. Therefore, the control can be facilitated and made correct, the map of the cylinder air mass can be easily measured, and the map of the target air-fuel ratio can be easily set. Therefore, the map production is facilitated. Furthermore, a throttle sensor for detecting the engine load, such as a throttle opening sensor or a throttle position sensor is not required.

Moreover, transient such as the acceleration state or the deceleration state is detected from the intake pressure, and the target air-fuel ratio is corrected. Therefore, the output characteristics of the engine in acceleration or deceleration can be changed from those which are set simply in accordance with the map of the target air-fuel ratio, to those which are required by the driver or close to the sense of the driver.

Since the engine speed is detected from the phase of the crankshaft, the engine speed can be easily detected. When the stroke state is detected from the phase of the crankshaft in place of a cam sensor, for example, it is possible to eliminate a cam sensor which is expensive and massive.

In the embodiment in which a cam sensor is not used as described above, the phase of the crankshaft and the stroke detection play important roles. In the embodiment in which the stroke detection is based only on the crank pulse and the intake pressure, however, the stroke cannot be detected until the crankshaft makes two rotations. The engine is stopped in any stroke. Namely, it is impossible to know the stroke in which cranking is started. In the embodiment, during a period from start of cranking to detection of the stroke, therefore, fuel injection is performed with using the crank pulse at a predetermined crank angle for each rotation of the crankshaft, and the ignition is performed in the vicinity of the compression top dead center for each rotation of the crankshaft. After the stroke is detected, fuel injection at which the target air-fuel ratio corresponding to the throttle opening can be attained is performed once in one cycle, and, until the engine speed reaches a predetermined value or larger, the ignition is performed with using the crank pulse in the vicinity of a timing at which a higher torque can be easily produced, and which is advanced by 10° from the compression top dead center.

Figure 12:
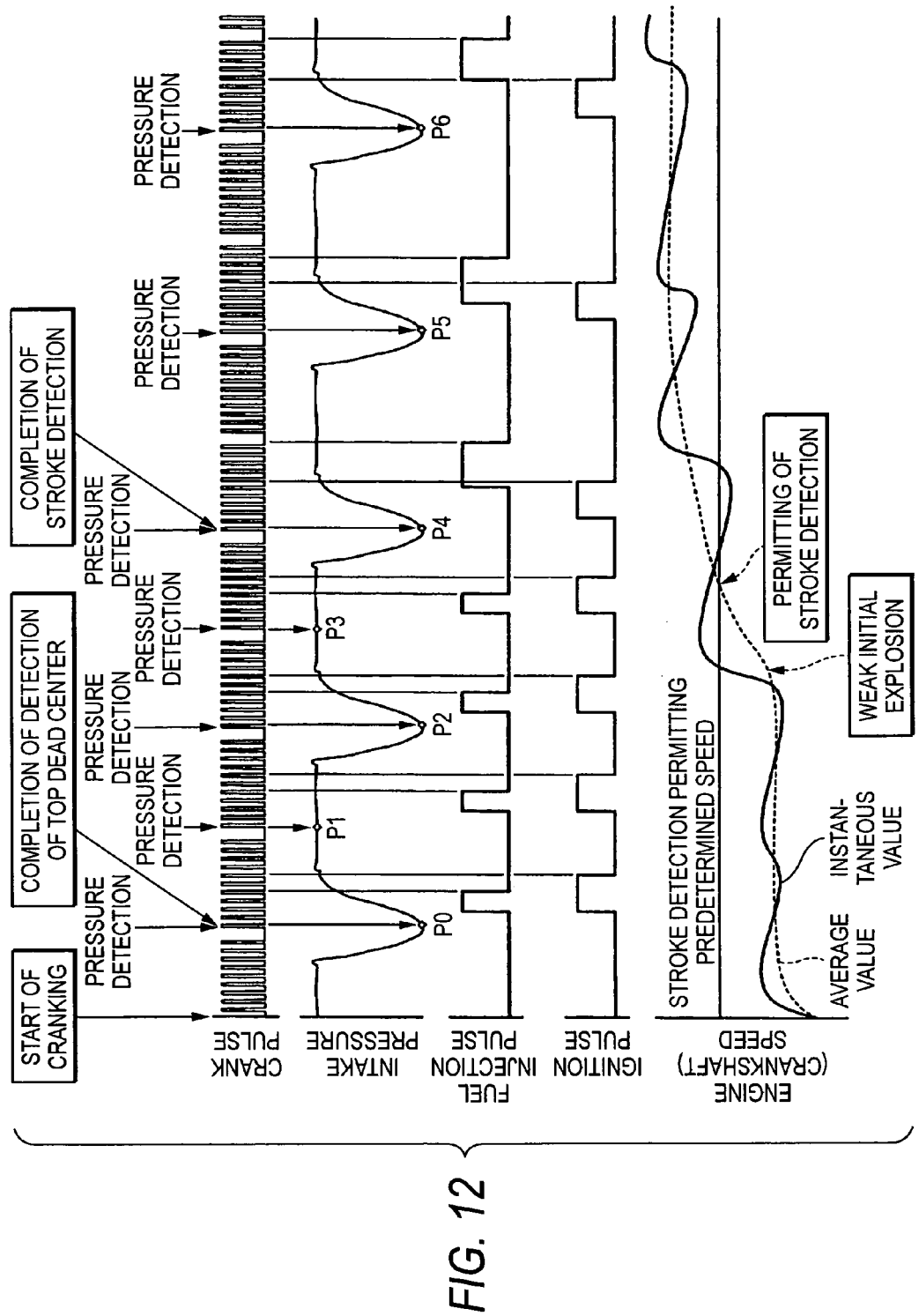
FIG. 12 is a view illustrating the operation of the computing process of FIG. 3 in engine start.

FIG. 12 shows changes with time in the engine (crankshaft) speed, the fuel injection pulse, and the ignition pulse in the case where initial explosion is obtained as a result of the above-described controls of the fuel injection and the ignition timing, but the initial explosion exhibits a relatively small explosion power. As described above, until the initial explosion is obtained and the average value of the engine speed becomes equal to or larger than the stroke detection permitting predetermined speed, the ignition pulse is output for each rotation of the crankshaft at the falling edge of crank pulse "0" or "12" (at this timing, this numbering may be incorrect) in FIG. 3, and the fuel injection pulse is output for each rotation of the crankshaft at the falling edge of crank pulse "10" or "22" (at this timing, this numbering may be incorrect) in FIG. 4. The ignition process is set so that the ignition is performed at the end of the ignition pulse, i.e., the falling edge, and the fuel injection process is set so that fuel injection is ended at the end of the fuel injection pulse, i.e., the falling edge.

As described above, the first and second fuel injections are performed in accordance with the total fuel injection amount which is set on the basis of the cooling water temperature, i.e., the engine temperature. During this process, an intake pressure $P_0$ of crank pulse "18" corresponding to the intake stroke, and an intake pressure $P_1$ of crank pulse "6" corresponding to the expansion stroke are obtained, and the intake pressure difference between them is equal to or larger than the predetermined value by which the stroke can be detected. Therefore, the third and fourth fuel injections are performed in accordance with the total fuel injection amount which is set on the basis of the lower one of the intake pressures, i.e., the intake pressure $P_0$ of crank pulse "18 " corresponding to the intake stroke.

As a result of the controls of fuel injection and ignition, weak explosion is obtained. Therefore, the average value of the engine speed is gently increased. At the timing when the average value becomes equal to or larger than the stroke detection permitting predetermined speed, the stroke detection is permitted. Consequently, the stroke detection is performed by comparison with the previous intake pressure at the same crank angle as described above. In this case, as a result of the stroke detection, the previous fuel injection is immediately before the intake stroke. Thereafter, consequently, fuel which can attain the target air-fuel ratio is injected only once in each cycle. By contrast, after the detection, also the ignition timing is performed only once in each cycle, but the cooling water temperature is not yet reached the predetermined temperature and the idling rotation speed is not stabilized. With respect to the ignition timing, therefore, the ignition pulse is output so as to coincide with a timing which is advanced by 10° from the compression top dead center, i.e., the rising edge of crank pulse "0" in FIG. 3. As a result, thereafter, the engine speed is rapidly increased.

Figure 13:
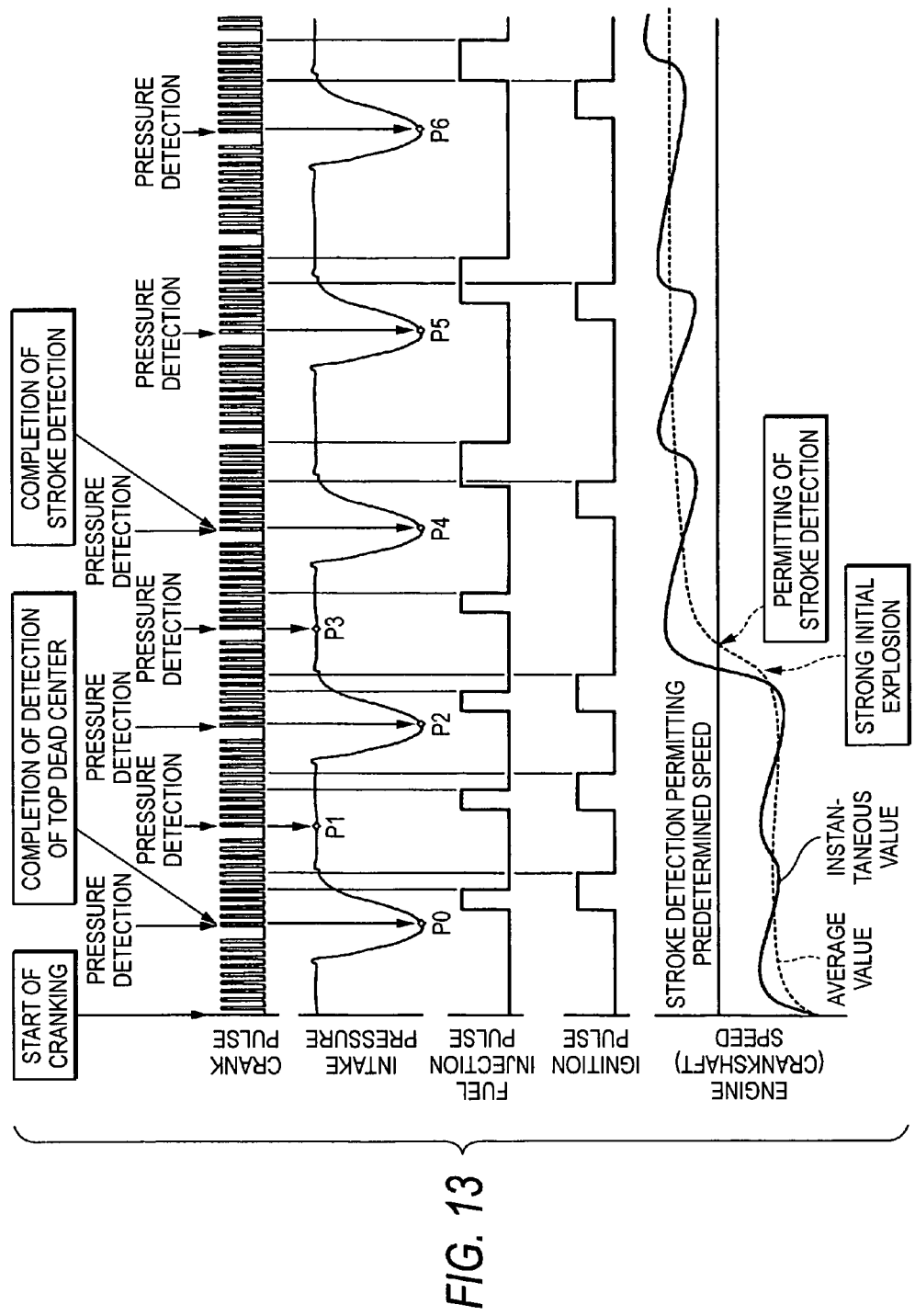
FIG. 13 is a view illustrating the operation of the computing process of FIG. 3 in engine start.

FIG. 13 shows changes with time in the engine (crankshaft) speed, the fuel injection pulse, and the ignition pulse in the case where large explosion power is obtained in the initial explosion as a result of similar controls of the fuel injection and the ignition timing in a cranking process. When the initial explosion is strong, the average value of the engine speed is rapidly increased, and, in a short time period, becomes equal to or larger than the stroke detection permitting predetermined speed, thereby permitting the stroke detection. In this case, as a result of the stroke detection, the previous fuel injection is not immediately before the intake stroke, or specifically is in the expansion stroke. Therefore, the same fuel injection amount is again injected at the crank angle same as the previous one, so that an ideal fuel amount is sucked in the subsequent intake stroke, whereby engine start can be stabilized.

As described above, in the embodiment, until the stroke is detected, fuel injection is performed at a predetermined crank angle in each rotation of the crankshaft, and, similarly in each rotation of the crankshaft, ignition is performed in the vicinity of the compression top dead center, whereby, although it may be weak, sure initial explosion can be obtained and the engine can be prevented from reversely rotating. When, before initial explosion is obtained, ignition is performed at a timing which is advanced from the compression top dead center, there is the possibility that the engine reversely rotates. After the detection is detected, fuel injection and ignition are performed once in one cycle. This ignition is performed in the vicinity of a timing which is advanced by 10° from the compression top dead center, so that the engine speed can be rapidly increased.

When, before detection of the stroke, fuel injection and ignition are performed once in one cycle, i.e., once in two rotations of the crankshaft, sure initial explosion cannot be obtained in the case where the fuel injection is performed after an intake process or the ignition is not performed at the compression top dead center. Namely, there occur a case where the engine is smoothly started, and another case where the engine is not started. In a two-wheeled vehicle in which the useful range of the engine speed is high, when, after the stroke is detected, fuel injection is performed once in one rotation of the crankshaft, fuel must continue to be injected, with the result that the dynamic range of the injector is restricted. When, also after the stroke is detected, ignition continues to be performed once in one rotation of the crankshaft, energy is wasted.

Next, a minor program which is performed in step S48 of the computing process of FIG. 9 will be described with reference to the flowcharts of FIGS. 14 to 16. In the computing process, when an ignition switch is turned on, an idling control flag $F_{IDLE}$ is reset to "0".

Figure 21:
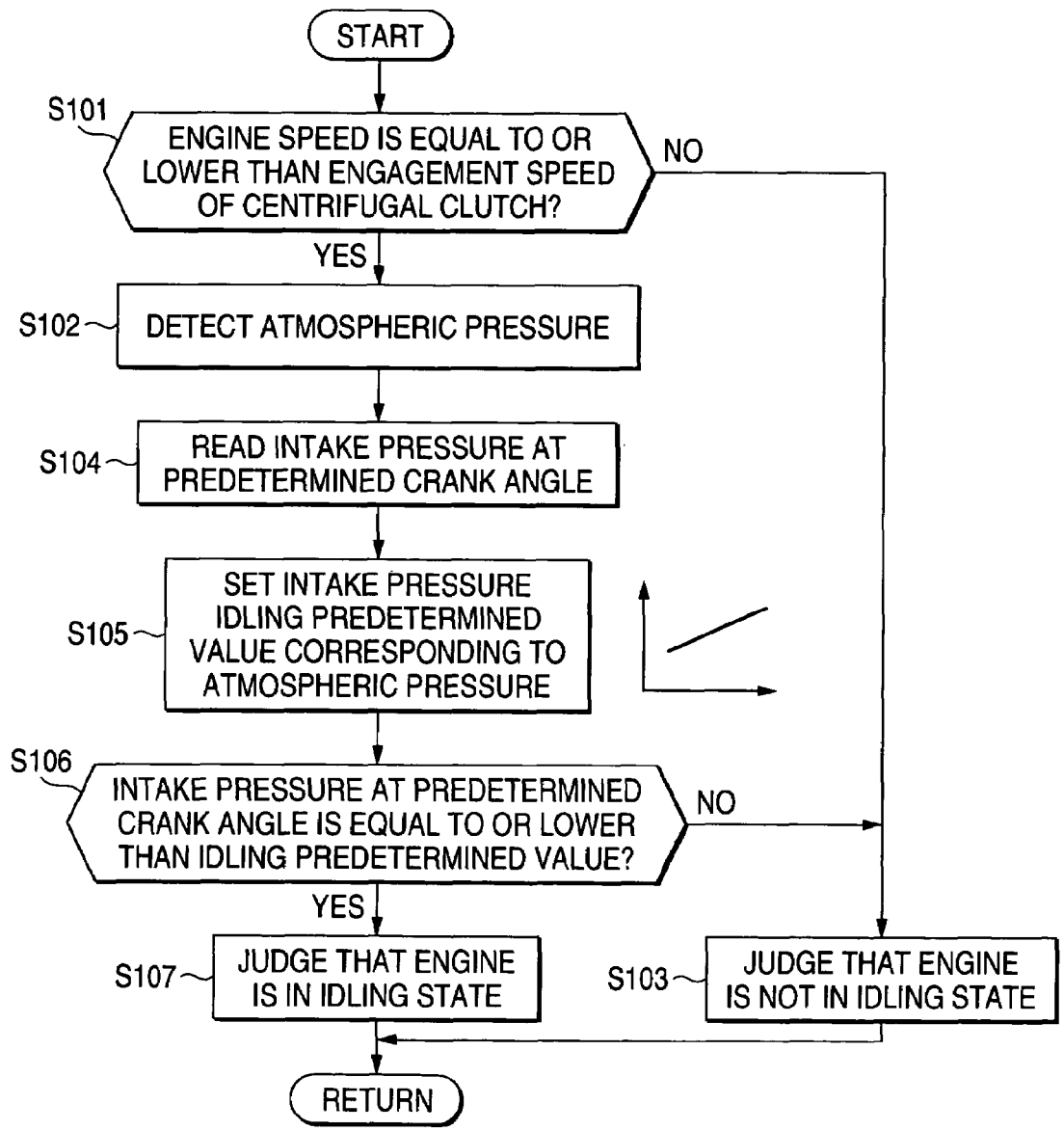
FIG. 21 is a flowchart showing a minor program which is performed in the computing process of FIG. 14.

In the computing process, first, a computing process of FIG. 21 which will be described later is conducted in step S51 to judge whether the engine is in the idling state or not. If the engine is in the idling state, the control proceeds to step S52. If not, the control proceeds to step S53. As described above, in the embodiment which is not provided with a throttle opening sensor, the idling state must be detected with using a detection value other than the throttle opening. In the embodiment, the centrifugal clutch is interposed between the engine and the transmission. As well known, when the engine speed is low, a centrifugal clutch is disengaged, and, when the engine speed is high, a centrifugal clutch is engaged. The engagement engine speed of the centrifugal clutch is previously set. When the average value of the engine speed calculated by the engine speed calculating section 26 is equal to or smaller than the engagement engine speed of the centrifugal clutch and the intake pressure of the intake pressure signal is lower than a predetermined value, therefore, the idling state is detected. According to the configuration, the idling state can be correctly detected without using a throttle opening sensor.

In step S53, the target ignition timing is calculated from a usual-running ignition timing map, and the control then proceeds to step S54. In a usual igniting process, generally, the highest torque is attained at a timing which is slightly advanced from the top dead center. In accordance with the driver's intention to accelerate which is to be reflected to the intake pressure, therefore, the ignition timing is adjusted with being centered at the highest-torque ignition timing.

In step S54, in accordance with a control map of FIG. 17 which will be described later, the idling ignition timing is set on the basis of the cooling water temperature, and the control then returns to the main program.

By contrast, in step S52, since the present state is the idling state, the target engine speed for allowing the engine to continue to rotate against friction is set on the basis of, for example, the cooling water temperature signal corresponding to the engine temperature. Thereafter, the control proceeds to step S55. Specifically, the friction of the engine approximately depends on the viscosity of lubricating oil. As a low temperature at which lubricating oil has a high viscosity is further enhanced, the target engine speed is set to be higher, and, as the temperature is higher, the target engine speed is set to be lower.

In step S55, it is judged whether the idling control flag $F_{IDLE}$ is "0" or not. If the idling control flag $F_{IDLE}$ is "0", the control proceeds to step S56. If not, the control proceeds to step S57.

In step S56, it is judged whether the present engine speed is equal to or lower than the target engine speed calculated in step S52 or not. If the present engine speed is equal to or lower than the target engine speed, the control proceeds to step S58. If not, the control proceeds to step S59.

In step S58, the idling control flag $F_{IDLE}$ is set to "1", and the control then proceeds to step S60.

In step S60, a gain K which is used for changing and setting the ignition timing is set to an initial gain $K_{INT}$ which is relatively large, and the control then proceeds to step S61.

Figure 15:
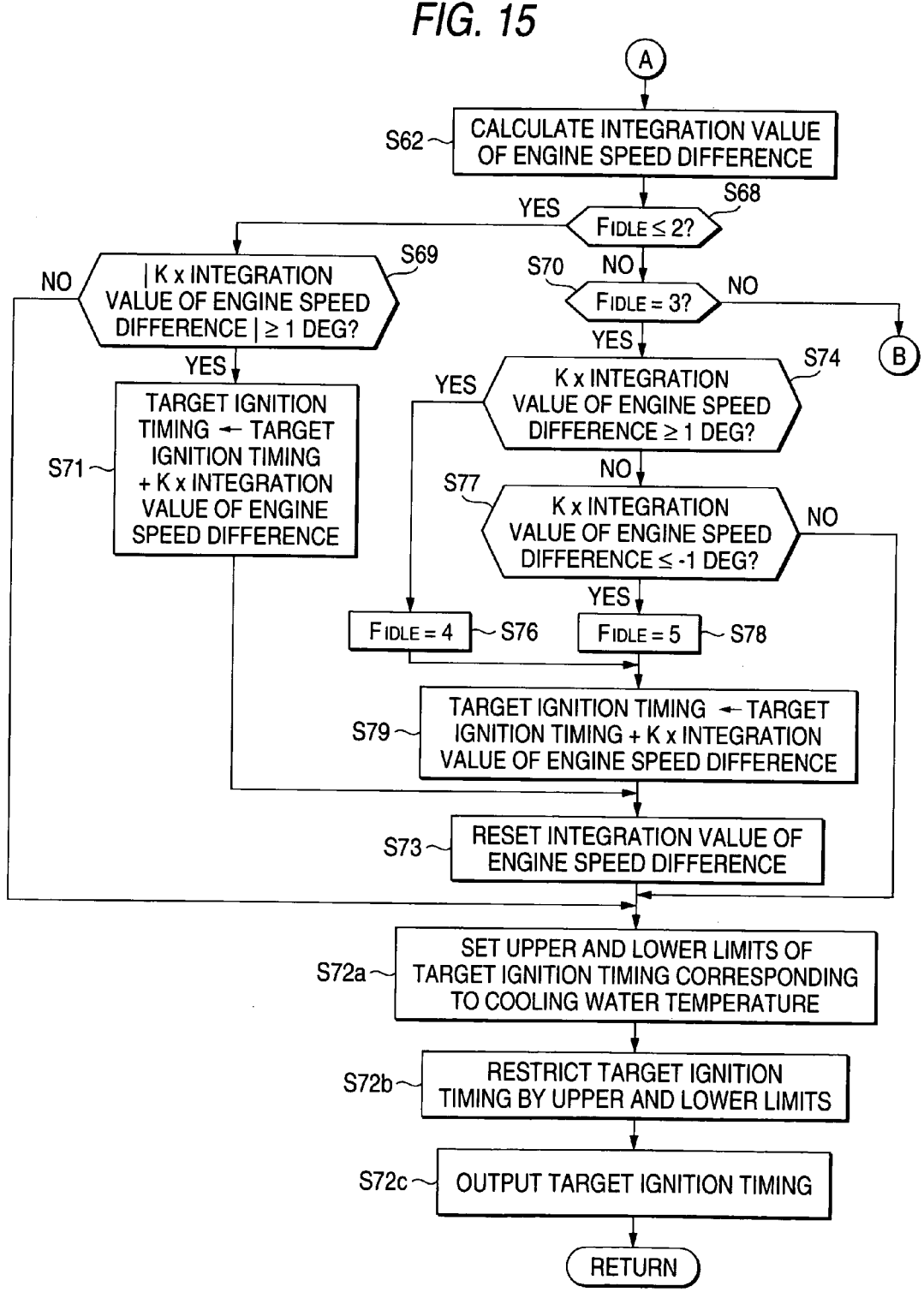
FIG. 15 is a flowchart showing a minor program which is performed in the computing process of FIG. 9.
Figure 17:
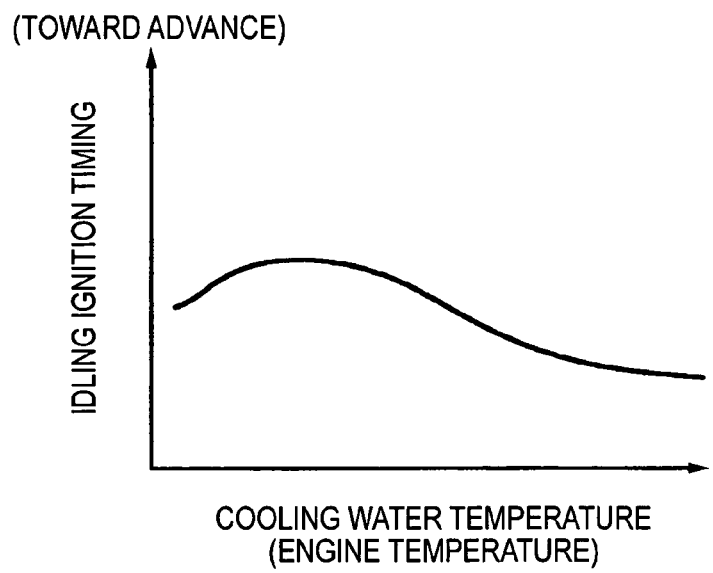
FIG. 17 is a control map which is used in computing processes of FIGS. 14 to 16.

In step S61, the target ignition timing based on the cooling water temperature, i.e., the engine temperature is set from the idling ignition timing map shown in, for example, FIG. 17, and the control then proceeds to step S62 (FIG. 15).

By contrast, in step S57, it is judged whether the idling control flag $F_{IDLE}$ is "1" or not. If the idling control flag $F_{IDLE}$ is "1", the control proceeds to step S63. If not, the control proceeds to step S64.

In step S63, it is judged whether the present engine speed is equal to or lower than a value which is obtained by subtracting a predetermined value α from the target engine speed or not. In step S57, the idling control flag $F_{IDLE}$ is "1", and hence the present engine speed is ought to be lower than the target engine speed. In the above, therefore, it is judged whether or not the present engine speed that is lower than the target engine speed is within a range of the predetermined value α with respect to the target engine speed. If the present engine speed is equal to or lower than the value which is obtained by subtracting the predetermined value α from the target engine speed, the control proceeds to step S62. If not, the control proceeds to step S65.

In step S64, it is judged whether the idling control flag $F_{IDLE}$ is "2" or not. If the idling control flag $F_{IDLE}$ is "2", the control proceeds to step S66. If not, the control proceeds to step S62.

In step S66, it is judged whether the present engine speed is equal to or lower than a value which is obtained by adding the predetermined value α to the target engine speed or not. In step S64, the idling control flag $F_{IDLE}$ is "2", and hence the present engine speed is ought to be higher than the target engine speed. In the above, therefore, it is judged whether or not the present engine speed that is higher than the target engine speed is within the range of the predetermined value α with respect to the target engine speed. If the present engine speed is equal to or lower than the value which is obtained by adding the predetermined value a to the target engine speed, the control proceeds to step S65. If not, the control proceeds to step S62.

In step S65, the idling control flag $F_{IDLE}$ is set to "3", and the control then proceeds to step S67.

In step S67, the gain K which is used for changing and setting the ignition timing is set to a usual gain $K_{STD}$ which is smaller than the initial gain $K_{INT}$, and the control then proceeds to step S62.

In step S62, the integration value of the difference between the present engine speed and the target engine speed, i.e., the engine speed difference is calculated. Specifically, the present engine speed difference is added to the integration value of the engine speed difference which is stored in the storage apparatus.

Then, the control proceeds to step S68 to judge whether the idling control flag $F_{IDLE}$ is equal to or smaller than "2" or not. If the idling control flag $F_{IDLE}$ is equal to or smaller than "2", the control proceeds to step S69. If not, the control proceeds to step S70.

In step S69, it is judged whether or not the absolute value of the product of the gain K and the integration value of the engine speed difference is equal to or larger than 1 deg. corresponding to one degree of the ignition timing which is set to be advanced or retarded. If the absolute value of the product of the gain K and the integration value of the engine speed difference is equal to or larger than 1 deg., the control proceeds to step S71. If not, the control proceeds to step S72a.

In step S71, a value which is obtained by adding the product value of the gain K and the integration value of the engine speed difference to the present target ignition timing is set as a new target ignition timing, and the control then proceeds to step S73.

In step S70, it is judged whether the idling control flag $F_{IDLE}$ is "3" or not. If the idling control flag $F_{IDLE}$ is "3", the control proceeds to step S74. If not, the control proceeds to step S75 (FIG. 16).

In step S74, it is judged whether or not the product of the gain K and the integration value of the engine speed difference is equal to or larger than +1 deg. corresponding to one degree of the ignition timing which is set to be advanced. If the product of the gain K and the integration value of the engine speed difference is equal to or larger than +1 deg., the control proceeds to step S76. If not, the control proceeds to step S77.

In step S77, it is judged whether or not the product of the gain K and the integration value of the engine speed difference is equal to or smaller than −1 deg. corresponding to one degree of the ignition timing which is set to be retarded. If the product of the gain K and the integration value of the engine speed difference is equal to or smaller than −1 deg., the control proceeds to step S78. If not, the control proceeds to step S72a.

In step S78, the idling control flag $F_{IDLE}$ is set to "5", and the control then proceeds to step S79.

By contrast, in step S76, the idling control flag $F_{IDLE}$ is set to "4", and the control then proceeds to step S79.

In step S79, a value which is obtained by adding the product value of the gain K and the integration value of the engine speed difference to the present target ignition timing is set as a new target ignition timing, and the control then proceeds to step S73.

In step S73, the integration value of the engine speed difference is reset or set to "0", and the control then proceeds to step S72a.

Figure 18:
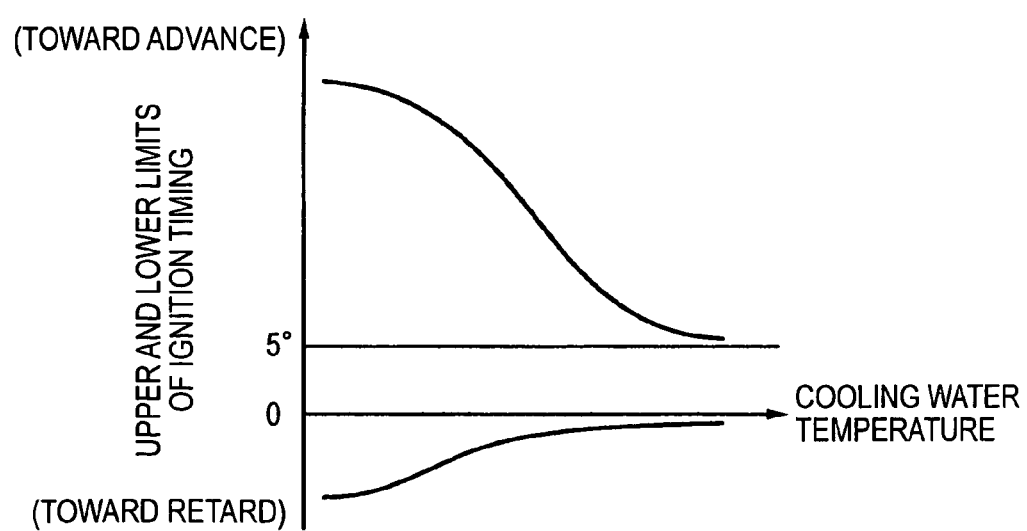
FIG. 18 is a control map which is used in the computing processes of FIGS. 15 and 16.

In step S72a, in accordance with a control map of FIG. 18, upper and lower limits of the target ignition timing corresponding to the cooling water temperature, i.e., the engine temperature are set, and the control then proceeds to step S72b. In the upper and lower limits of the target ignition timing, the upper limit means a limiting value toward advance (a positive value with respect to the compression top dead center), and the lower limit means a limiting value toward retard (a negative value with respect to the compression top dead center). In the control map of FIG. 18, as the cooling water temperature, i.e., the engine temperature is higher, the upper limit is set to be smaller, and the lower limit is set to be larger, or the width between the limits is made narrower. In an example case where an ideal idling ignition timing is at 5° before the compression top dead center, as the cooling water temperature, i.e., the engine temperature is higher, the upper limit of the target ignition timing is set to be closer to 5° before the compression top dead center, and the lower limit of the target ignition timing is set to be closer to the compression top dead center. This is conducted because the operation state of the engine is more stable as the engine temperature is higher, it is not necessary to set the ignition timing to be excessively advanced, and there is no need for such setting.

In step S72b, the target ignition timing which is set in step S71 or S79 is restricted by the upper and lower limits of the target ignition timing which are set in step S72a, to set a new target ignition timing. Thereafter, the control proceeds to step S72c.

In step S72c, the target ignition timing which is set in step S72b is output, and the control then returns to the main program.

In step S75, it is judged whether the idling control flag $F_{IDLE}$ is "4" or not. If the idling control flag $F_{IDLE}$ is "4", the control proceeds to step S80. If not, the control proceeds to step S81.

In step S80, it is judged whether or not the product of an advancing gain $K_{ADV}$ which is relatively small and the integration value of the engine speed difference is equal to or larger than +1 deg. corresponding to one degree of the ignition timing which is set to be advanced. If the product of the advancing gain $K_{ADV}$ and the integration value of the engine speed difference is equal to or larger than +1 deg., the control proceeds to step S82. If not, the control proceeds to step S83.

In step S83, it is judged whether or not the product of the usual gain $K_{STD}$ and the integration value of the engine speed difference is equal to or smaller than −1 deg. corresponding to one degree of the ignition timing which is set to be retarded. If the product of the usual gain $K_{STD}$ and the integration value of the engine speed difference is equal to or smaller than −1 deg., the control proceeds to step S84. If not, the control proceeds to step S85a.

In step S84, the idling control flag $F_{IDLE}$ is set to "5", and the control then proceeds to step S86.

In step S86, a value which is obtained by adding the integration value of the usual gain $K_{STD}$ and the integration value of the engine speed difference to the present target ignition timing is set as a new target ignition timing, and the control then proceeds to step S87.

In step S82, a value which is obtained by adding the product value of the advancing gain $K_{ADV}$ and the integration value of the engine speed difference to the present target ignition timing is set as a new target ignition timing, and the control then proceeds to step S87.

By contrast, in step S81, it is judged whether or not the product of a retarding gain $K_{DLY}$ which is relatively small and the integration value of the engine speed difference is equal to or smaller than −1 deg. corresponding to one degree of the ignition timing which is set to be retarded. If the product of the retarding gain $K_{DLY}$ and the integration value of the engine speed difference is equal to or smaller than −1 deg., the control proceeds to step S88. If not, the control proceeds to step S89.

In step S89, it is judged whether or not the product of the usual gain $K_{STD}$ and the integration value of the engine speed difference is equal to or larger than +1 deg. corresponding to one degree of the ignition timing which is set to be advanced. If the product of the usual gain $K_{STD}$ and the integration value of the engine speed difference is equal to or larger than +1 deg., the control proceeds to step S90. If not, the control proceeds to step S85a.

In step S90, the idling control flag $F_{IDLE}$ is set to "4", and the control then proceeds to step S91.

In step S91, a value which is obtained by adding the product value of the usual gain $K_{STD}$ and the integration value of the engine speed difference to the present target ignition timing is set as a new target ignition timing, and the control then proceeds to step S87.

In step S88, a value which is obtained by adding the product value of the retarding gain $K_{DLY}$ and the integration value of the engine speed difference to the present target ignition timing is set as a new target ignition timing, and the control then proceeds to step S87.

In step S87, the integration value of the engine speed difference is reset or set to "0", and the control then proceeds to step S85a.

In step S85a, in the same manner as step S72a, in accordance with the control map of FIG. 18, upper and lower limits of the target ignition timing corresponding to the cooling water temperature, i.e., the engine temperature are set, and the control then proceeds to step S85b.

In step S85b, the target ignition timing which is set in step S82, S86, S88, or S91 is restricted by the upper and lower limits of the target ignition-timing which is set in step S85a, to set a new target ignition timing. Thereafter, the control proceeds to step S85c.

In step S85c, the target ignition timing is output, and the control then returns to the main program.

Next, the idling ignition timing map of FIG. 17 will be described. As described above, when the cooling water temperature, i.e., the engine temperature is low, lubricating oil has a high viscosity. In the idling state, therefore, the engine therefore must continue to rotate against the friction due to the viscosity, and the ignition timing is set to be further advanced so as to attain the higher torque. This results also in that, when the cooling water temperature, i.e., the engine temperature is high, the ignition timing is set to be less advanced, and hence sudden increase of the speed of an engine which is warmed up is prevented from occurring. In an engine of a completely cool state, when the ignition timing is set to be excessively advanced, however, so-called kick-back in which the engine tries to reversely rotate and is then stopped occurs. Therefore, the ignition timing is set to a small value toward advance.

Figure 14:
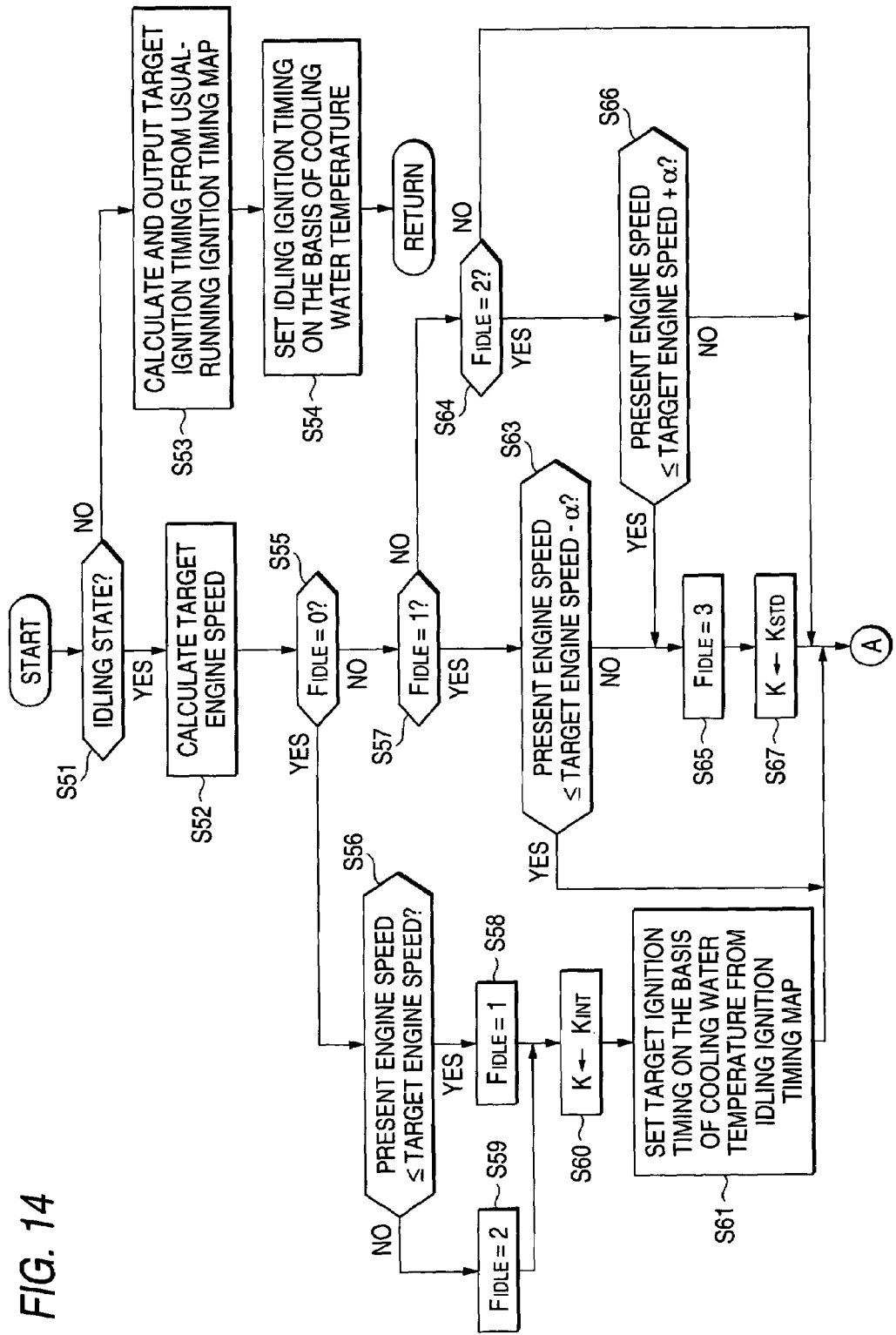
FIG. 14 is a flowchart showing a minor program which is performed in the computing process of FIG. 9.
Figure 16:
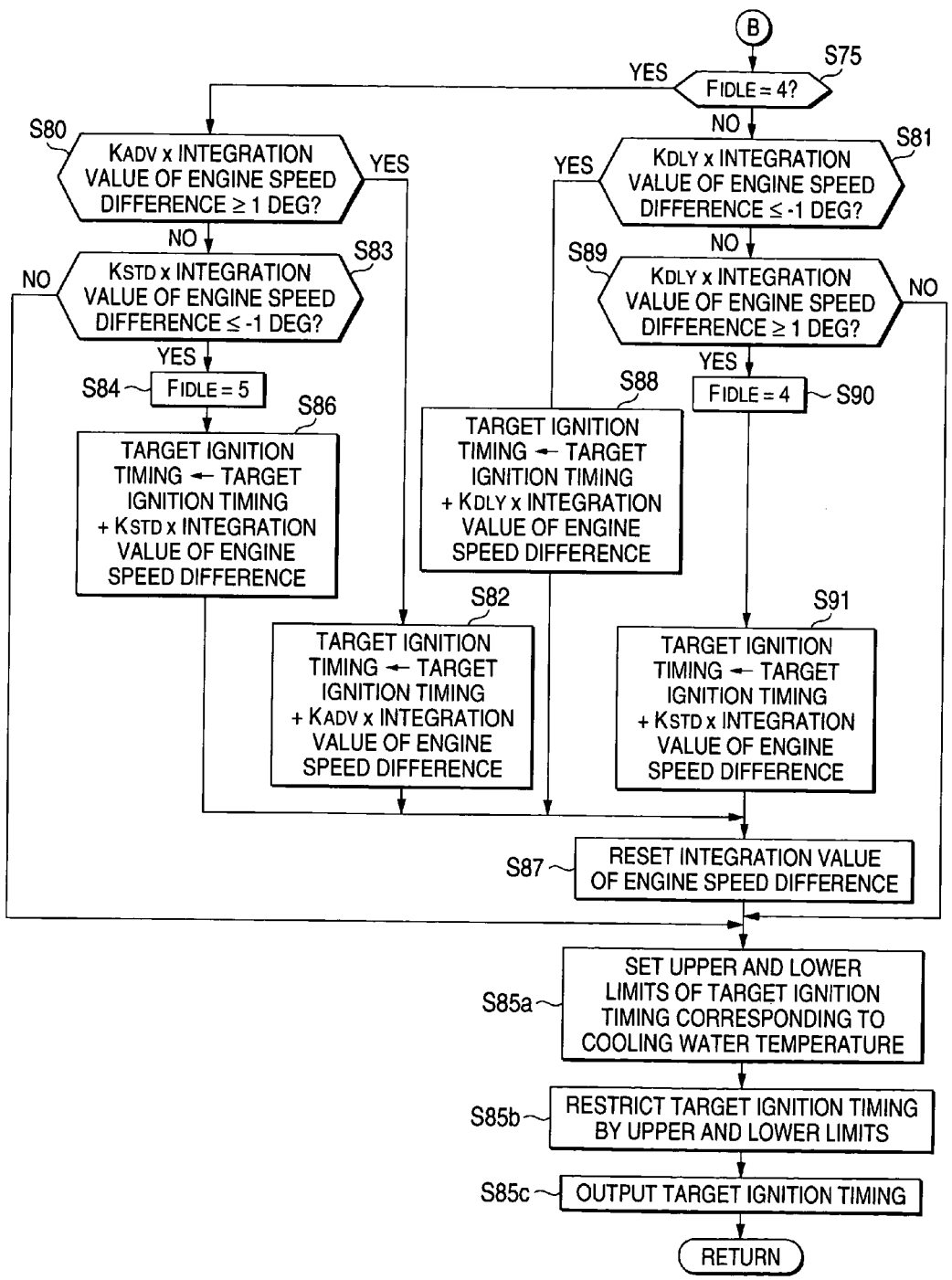
FIG. 16 is a flowchart showing a minor program which is performed in the computing process of FIG. 9.

According to the computing processes of FIGS. 14 to 16, after the engine is started and the engine speed becomes equal to or larger than the predetermined value, therefore, the gain K is set to the initial gain $K_{INT}$ which is relatively large, and the target ignition timing corresponding to the cooling water temperature, i.e., the engine temperature at this time is set. As a result, until the present engine speed is lower than the target engine speed and enters the range of the predetermined value α with respect to the target engine speed, the target ignition timing is changed to be advanced by a value which is obtained by multiplying the integration value of the speed difference between the target engine speed and the present engine speed with the gain K that is set to the initial gain $K_{INT}$ which is relatively large, whereby the engine speed is rapidly increased. By contrast, when the present engine speed is larger than the target engine speed and is not within the range of the predetermined value a with respect to the target engine speed, the target ignition timing is changed to be retarded by a value which is obtained by similarly multiplying the integration value of the engine speed difference with the gain K that is set to the initial gain $K_{INT}$ which is relatively large, whereby the engine speed is rapidly reduced.

When the present engine speed is changed from this state to enter the range of the predetermined value α with respect to the target engine speed, the gain K is set to the usual gain $K_{STD}$ which is smaller than the initial gain $K_{INT}$, and the ignition timing is changed to be advanced or retarded by the product of the gain K set to the usual gain $K_{STD}$ and the integration value of the engine speed difference. When the integration value of the engine speed difference which is obtained by subtracting the present engine speed from the target engine speed is positive, the ignition timing is changed to be advanced, and the engine speed is increased. When the integration value of the engine speed difference is negative, the ignition timing is changed to be retarded, and the engine speed is reduced.

After the ignition timing is changed to be advanced or retarded in this way, in the next computing process, the changing amount of the target ignition timing in the changed side is set with using the advancing gain $K_{ADV}$ or the retarding gain $K_{DLY}$ which is relatively small. Namely, for example, in the case where the ignition timing is changed to be advanced in the previous setting, in the next and subsequent settings in which the ignition timing is changed to be advanced, the changing amount of the target ignition timing is set with using the advancing gain $K_{ADV}$ which is relatively small, and hence the ignition timing is hardly changed in the substantially same side. Conversely, in the case where the ignition timing is changed to be advanced in the previous setting, in the next and subsequent settings in which the ignition timing is changed to be retarded, the changing amount of the target ignition timing is set with using the usual gain $K_{STD}$, and hence the ignition timing is easily changed in the opposite side. This is similarly performed also in the case where the ignition timing is previously changed to be retarded.

Figure 19:
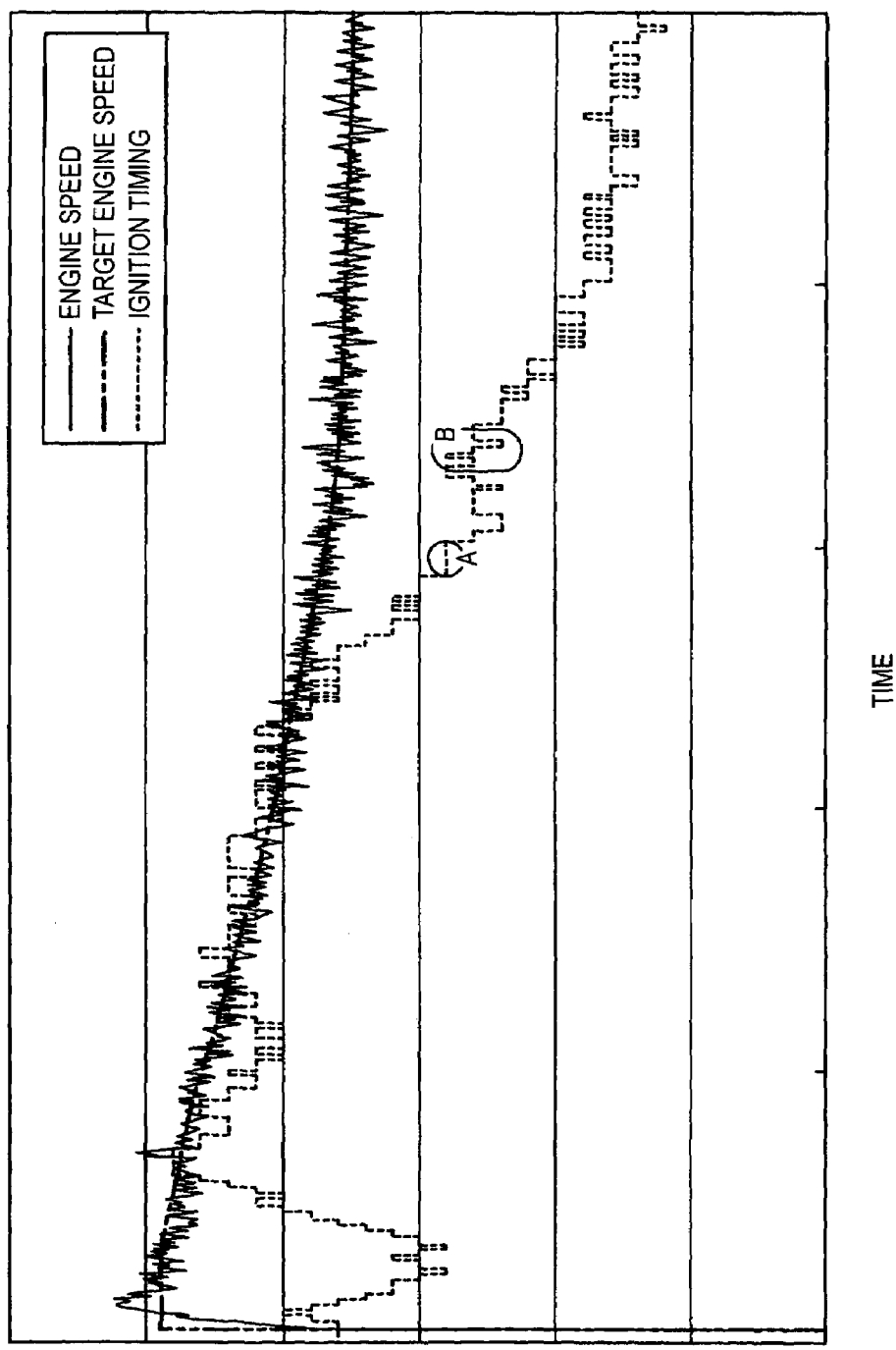
FIG. 19 is a view illustrating an ignition timing immediately after engine start.

FIG. 19 shows changes with time in the ignition timing, the target engine speed, and the engine speed immediately after start of the engine which is controlled by the computing processes of FIGS. 14 to 16. Immediately after engine start, the ignition timing is rapidly changed to be advanced by the initial gain $K_{INT}$, whereby the engine speed is rapidly increased. When the engine speed approaches the target engine speed, the gain is switched to the usual gain $K_{STD}$, so that overshoot of the engine speed with respect to the target engine speed is suppressed.

When the engine is started, the engine is warmed and the cooling water temperature is raised, with the result that the target engine speed is gradually reduced. In accordance with the reduction of the target engine speed, also the ignition timing is gradually changed to be retarded, or more strictly to a small value toward advance. As shown in the portion A in the figure, for example, the ignition timing is not changed even when the target engine speed and the engine speed do not coincide with each other. This is caused by the above-mentioned effect of suppressing the change of the ignition timing in the same side. Namely, in the portion A, continuous changes of the ignition timing toward retard are suppressed by the retarding gain $K_{DLY}$ which is relatively small, whereby the control can be prevented from hunting. By contrast, as shown in the portion B in the figure, in a change of the ignition timing to the opposite side, the engine speed is caused to follow the target engine speed while ensuring the responsiveness, by the usual gain $K_{STD}$.

Figure 20:
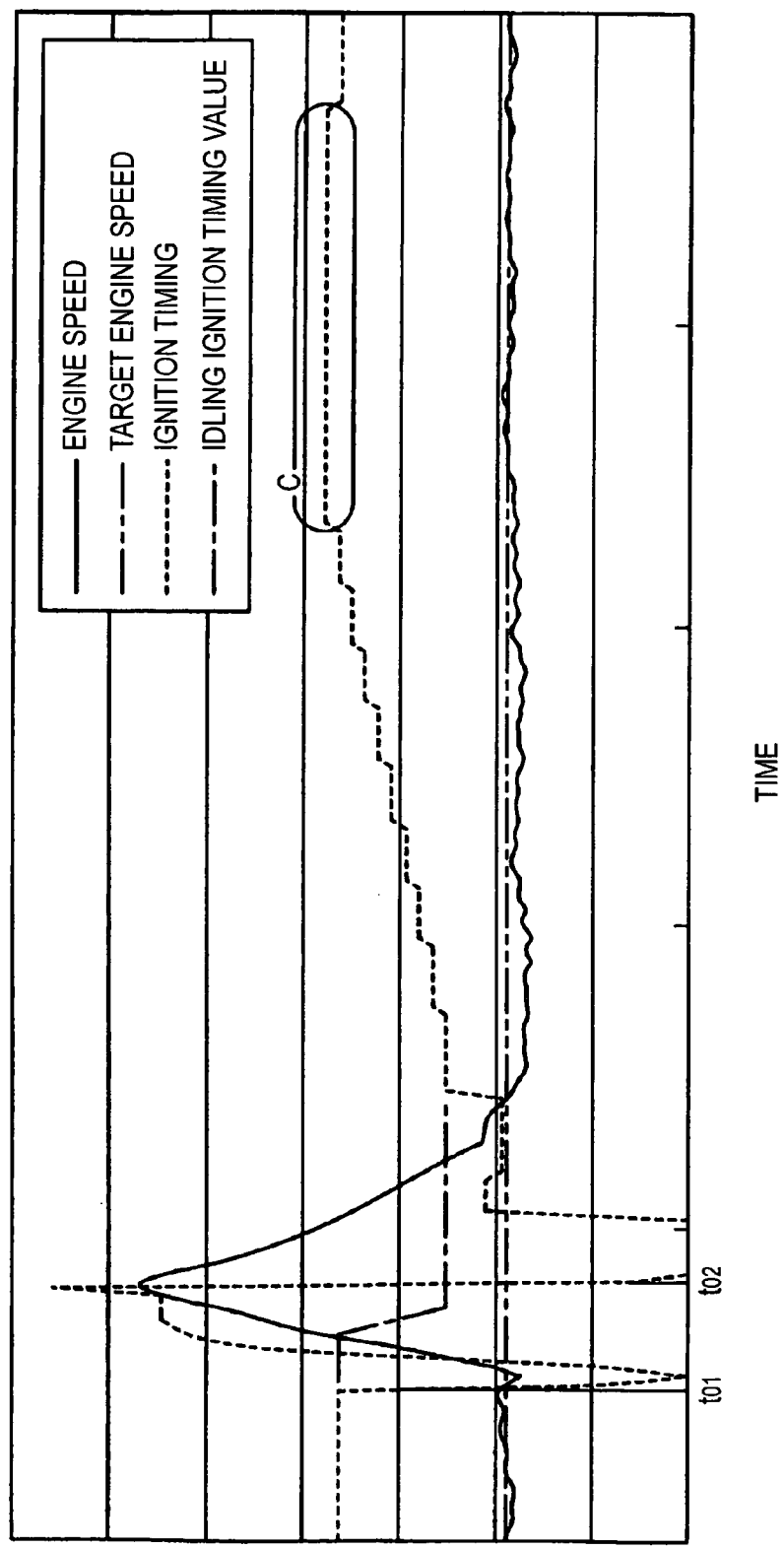
FIG. 20 is a view illustrating an ignition timing in transition from a throttle-on state to a throttle-off state.

On the other hand, FIG. 20 shows changes with time in the ignition timing, the target engine speed, the engine speed, and the idling ignition timing set value which is set in accordance with the cooling water temperature, i.e., the engine temperature in the case where, when the engine is warmed up and the idling is stabilized, the throttle is largely opened at time $t_{01}$ and the throttle is totally closed or the state is returned to the idling state at time $t_{02}$. At the same time when the throttle is turned on, the ignition timing is once changed to the retarding side, and then largely changed toward advance, to obtain a sharp increase in torque, whereby the engine speed is rapidly increased. During this period, the idling ignition timing set value is set to a value which is smaller than that which is set before the throttle-on operation. After the throttle is turned off at time $t_{02}$, the ignition timing coincides with the idling ignition timing set value, and is thereafter gradually changed toward advance. In the engine which is warmed up, the ignition timing which is optimum for making the idling engine speed coincident with the target engine speed is ought to be an ignition timing in the portion C in the figure. As compared with this, the idling ignition timing set value according to the cooling water temperature is set to be smaller, in order to rapidly reduce the engine speed in response to a throttle-off operation. If the ignition timing at throttle-off is set to a value in the vicinity of the portion C, the torque is excessively generated and the engine speed is hardly reduced. In this way, the idling ignition timing set value according to the cooling water temperature is set to be small, so that the engine speed at throttle-off can be rapidly reduced.

Next, a computing process of FIG. 21 which is performed in step S51 of the computing process of FIG. 14 will be described. In the computing process, first, it is judged in step S101 whether the engine speed calculated by the engine speed calculating section 26 is equal to or lower than the engagement speed of the centrifugal clutch or not. If the engine speed is equal to or lower than the centrifugal clutch engagement speed, the control proceeds to step S102. If not, the control proceeds to step S103.

In step S102, the atmospheric pressure is detected from the atmospheric pressure signal, and the control then proceeds to step S104. It is known that, when the engine speed is low or the engine load is small, for example, the intake pressure immediately before the intake valve is opened, such as shown in FIG. 4 is substantially equal to the atmospheric pressure. Therefore, the atmospheric pressure is detected with using the intake pressure immediately before the intake valve is opened. According to the configuration, an atmospheric pressure sensor is not required, and the number of parts is correspondingly reduced, so that the cost can be lowered.

In step S104, for example, the intake pressure at crank pulse "18" shown in FIG. 4 is read as the intake pressure at the predetermined crank angle, and the control then proceeds to step S105.

Figures 22A, 22B:
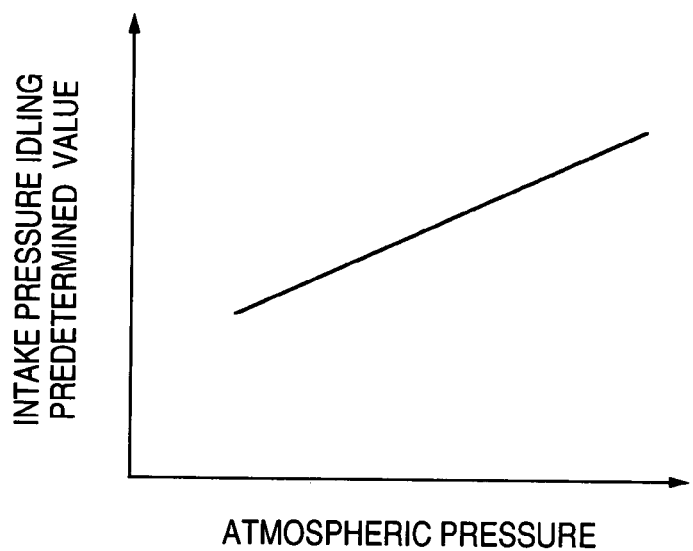
FIGS. 22a and 22b are control maps which are used in the computing process of FIG. 21.

In step S105, on the basis of the atmospheric pressure detected in step S102, an intake pressure idling predetermined value corresponding to the atmospheric pressure is set in accordance with a control map of FIG. 22a, and the control then proceeds to step S106. As the atmospheric pressure is higher, the whole intake pressure is higher. Therefore, the control map of FIG. 22a is configured so that, as the atmospheric pressure is higher, the intake pressure idling predetermined value is set to a larger value. The intake pressure idling predetermined value may not be set so as to be continuously changed as shown in FIG. 22a. Alternatively, as shown in the table of FIG. 22b, the value may be set in a somewhat stepwise manner. In the alternative also, as the atmospheric pressure is higher, the intake pressure idling predetermined value is set to a larger value.

In step S106, it is judged whether or not the intake pressure at the predetermined crank angle which is read in step S104 is equal to or lower than the intake pressure idling predetermined value which is set in step S105. If the intake pressure is equal to or lower than the intake pressure idling predetermined value, the control proceeds to step S107. If not, the control proceeds to step S103.

In step S107, it is judged that the engine is in the idling state, and the control then proceeds to step S52 of the computing process of FIG. 14.

In step S103, it is judged that the engine is not in the idling state, and the control then proceeds to step S52 of the computing process of FIG. 14.

In the computing process, when the engine speed is equal to or lower than the centrifugal clutch engagement speed and the intake pressure at the predetermined crank angle is equal to or lower than the idling predetermined value, it is judged that the engine is in the idling state. The intake pressure idling predetermined value is set in accordance with the atmospheric pressure. As described above, the intake pressure is varied in accordance with the atmospheric pressure. When the intake pressure idling predetermined value is not set in accordance with the atmospheric pressure, therefore, the idling state cannot be correctly detected. When the intake pressure idling predetermined value is not set in accordance with the atmospheric pressure and is set to be slightly larger while producing a margin, for example, the intake pressure does not exceed the idling predetermined value although the engine speed is increased, and hence the transfer to an adequate acceleration control is delayed. Conversely, when the intake pressure idling predetermined value is set to be slightly smaller, detection of the idling state is excessively severe so that the control in the idling state and that in the non-idling state hunt. When the intake pressure idling predetermined value is set in accordance with the atmospheric pressure, therefore, the idling state can be correctly detected, and transfer to the control in the non-idling state can be adequately performed.

Figure 23:
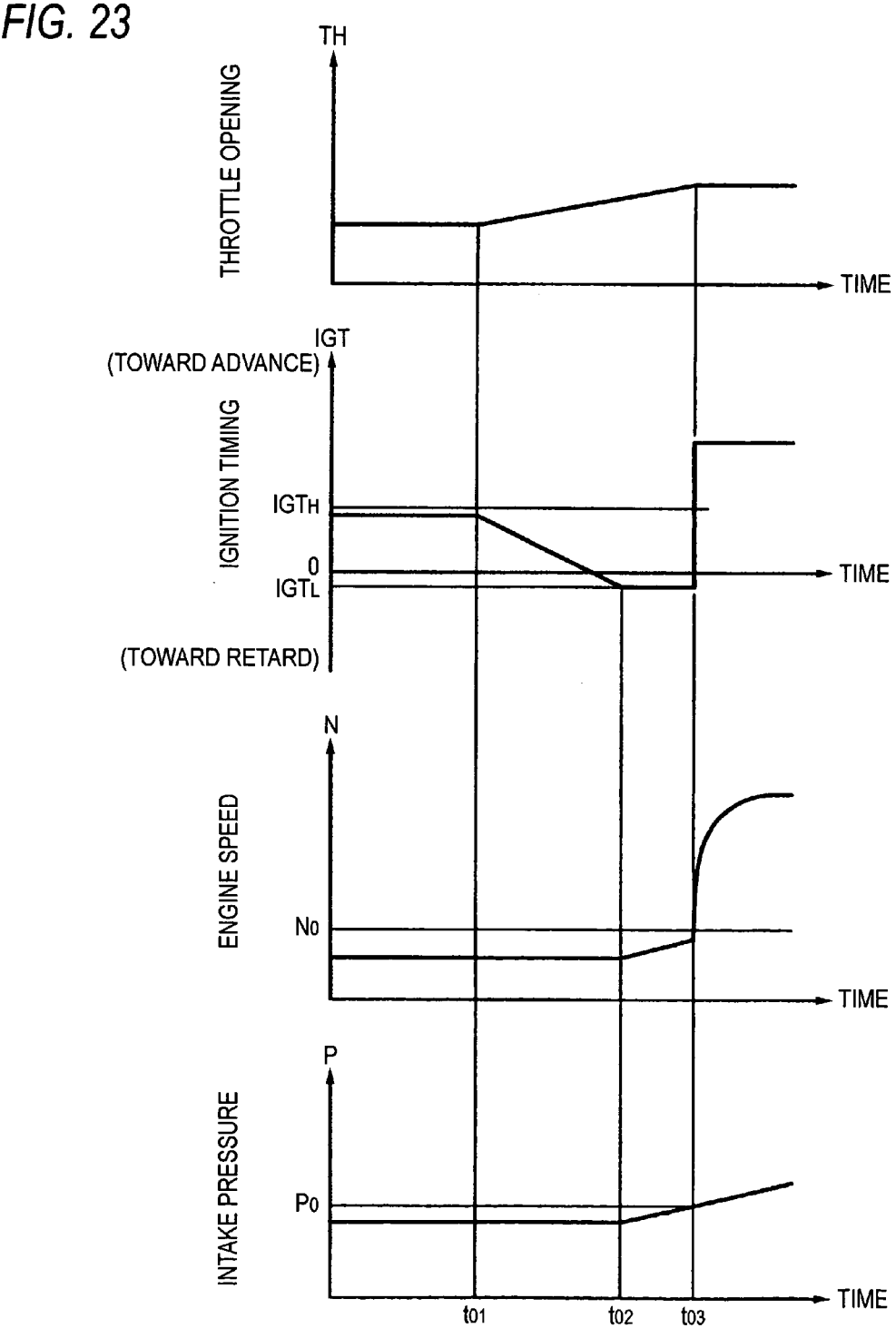
FIG. 23 is a view illustrating the ignition timing, the intake pressure, and the engine speed in the case where a throttle is slowly opened.

FIG. 23 shows changes with time in the ignition timing IGT, the engine speed N, and the intake pressure P in the case where the throttle opening TH is increased very slowly from time $t_{01}$ with starting from the totally closed state of the throttle under the condition that, after the engine is sufficiently warmed up, the upper and lower limits $IGT_H$, $IGT_L$ of the ignition timing are adequately set in accordance with the cooling water temperature, i.e., the engine temperature, and the intake pressure idling predetermined value $P_0$ is adequately set in accordance with the atmospheric pressure. In this simulation, as the throttle opening TH is increased very slowly, the phenomenon ought originally to be observed in which the intake pressure P is raised and the engine speed N is correspondingly increased, but, since it is judged to remain in the idling state as a result of the computing process of FIG. 21, the computing processes of FIGS. 14 to 16 gradually change the ignition timing IGT to the retarding side so as to maintain the target engine speed in the idling state, with the result that both the engine speed N and the intake pressure P are almost unchanged. As described above, however, the upper and lower limits $IGT_H$, $IGT_L$ of the ignition timing are adequately set in accordance with the cooling water temperature, i.e., the engine temperature. Therefore, the lower limit $IGT_L$ of the ignition timing is set to a negative value having a relatively small absolute value, and the ignition timing IGT is restricted at time $t_{02}$ by the lower limit $IGT_L$ of the ignition timing. After time $t_{02}$, the intake pressure P is raised, and the engine speed N is correspondingly increased. Before the engine speed N becomes equal to higher than the centrifugal clutch engagement speed $N_0$ or at time $t_{03}$, it is judged that the engine is not in the idling state. Consequently, transfer to the acceleration control is performed, and the ignition timing IGT is changed toward advance, so that the engine speed N is largely increased.

Figure 24:
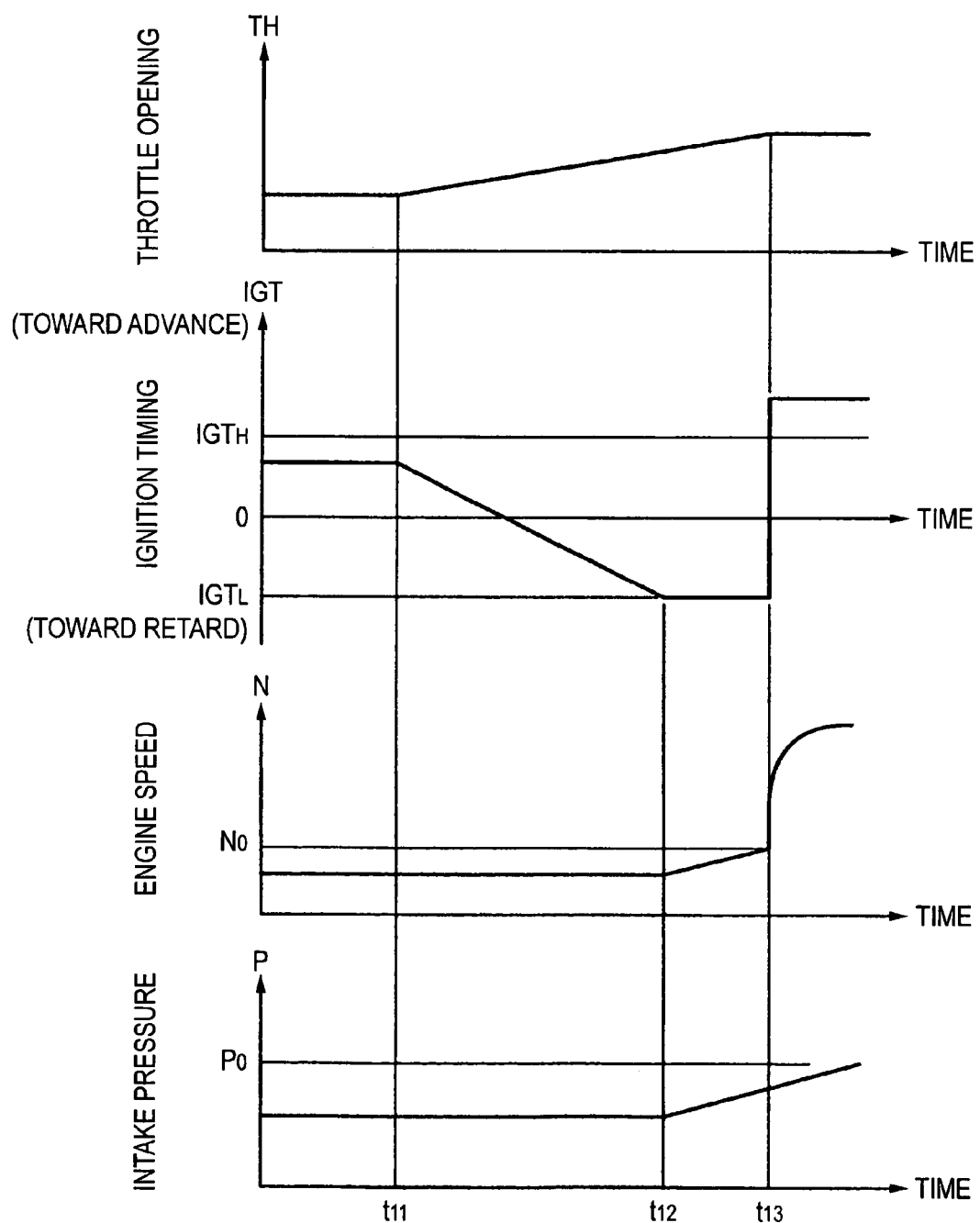
FIG. 24 is a view illustrating the ignition timing, the intake pressure, and the engine speed in the case where the throttle is slowly opened.

By contrast, FIG. 24 shows a simulation in which the upper and lower limits $IGT_H$, $IGT_L$ of the ignition timing are not set in accordance with the cooling water temperature, i.e., the engine temperature, and the intake pressure idling predetermined value $P_0$ is not set in accordance with the atmospheric pressure. In this simulation, the upper limit $IGT_H$ of the ignition timing is set to a largish value, the lower limit $IGT_L$ of the ignition timing is set to a smallish value, the intake pressure idling predetermined value $P_0$ is set to a largish value, and the throttle opening TH is increased very slowly from time $t_{11}$. As a result, in order to maintain the target engine speed in the idling state, the ignition timing IGT is changed more and more to the retarding side, and reaches the lower limit $IGT_L$ of the ignition timing to be restricted thereto, at time $t_{12}$ at which a considerably long time period has elapsed from the start of the process of opening the throttle, with the result that the intake pressure P is raised and the engine speed N is increased. However, since the intake pressure idling predetermined value $P_0$ is large, the engine speed N becomes equal to higher than the centrifugal clutch engagement speed $N_0$ at time $t_{13}$ at which the intake pressure P has not yet reached the idling predetermined value $P_0$. The transfer to the acceleration control is permitted only after a considerably long time period has elapsed from time $t_{11}$ or the start of the process of opening the throttle. A situation similar to the above occurs also in the case where, for example, the closing degree of the throttle valve is adjusted by an idle screw. Even when the idle screw is adjusted, the idling engine speed is hardly increased.

Although an engine of the intake pipe injection type is described in detail in the embodiment, the engine controller of the invention can be similarly applied also to an engine of the cylinder injection type, or a so-called direction-injection engine.

Although a single-cylinder engine is described in detail in the embodiment, the engine controller of the invention can be similarly applied also to an engine having two or more cylinders, or a so-called multi-cylinder engine.

The engine control unit can be realized by various kinds of computing circuits in place of a microcomputer.

INDUSTRIAL APPLICABILITY

As described above, according to the engine controller of claim 1 of the invention, when an idling state of an engine is detected, the ignition timing is set in accordance with the difference between the target engine speed and the detected engine speed. By a degree corresponding to the difference between the target engine speed which is set on the basis of the engine temperature such as the cooling water, and the detected engine speed, for example, the ignition timing can be changed toward advance to increase the engine speed, or changed to the retarding side to reduce the engine speed. According to the configuration, an unstable engine speed in an idling state such as a state immediately after start of rotation of an engine can be controlled to a rotation state which is adequate at this time.

According to the engine controller of claim 2 of the invention, when the ignition timing is changed to one of an advancing side and a retarding side, continuation of a change of the ignition timing to the same side is avoided. Therefore, the engine speed in the idling state can be prevented from being excessively increased, or from being excessively reduced.

According to the engine controller of claim 3 of the invention, the ignition timing is set by multiplying an integration value of the difference between the target engine speed and the detected engine speed, with a predetermined gain. When the difference between the target engine speed and the detected engine speed is not converged, the ignition timing is changed, whereby the engine speed in the idling state can be prevented from being excessively increased, or from being excessively reduced. Furthermore, when the gain which is to be multiplied with the integration value of the engine speed difference is adequately set, the engine speed in the idling state immediately after start of rotation of the engine can be rapidly increased, and the engine speed in the idling state can be surely prevented from being excessively increased, or from being excessively reduced.

According to the engine controller of claim 4 of the invention, when the ignition timing is changed to one of the advancing side and the retarding side, the ignition timing change setting gain for the same side is set to a smaller value, the ignition timing change setting gain being to be multiplied with the integration value of the difference between the target engine speed and the detected engine speed. Therefore, the engine speed in the idling state can be surely prevented from being excessively increased, or from being excessively reduced.

According to the engine controller of claim 5 of the invention, immediately after start of rotation of the engine, the gain which is to be multiplied with the integration value of the difference between the target engine speed and the detected engine speed is set to a larger value. Therefore, the engine speed after start of rotation of the engine can be rapidly increased.

According to the engine controller of claim 6 of the invention, the ignition timing at a state change of the engine from a state other than the idling state to the idling state is set on the basis of the detected engine temperature. Therefore, the engine speed can be adequately reduced in an idling state transition period from a throttle-on state to a throttle-off state.

According to the engine controller of claim 7 of the invention, upper and lower limits of the ignition timing are set on the basis of the engine temperature, and the ignition timing is restricted by the upper and lower limits. Therefore, the sense of incongruity that the engine speed is not changed in spite of a change of the throttle opening can be reduced.

According to the engine controller of claim 8 of the invention, the upper and lower limits of the ignition timing are set so that the width between the upper and lower limits is narrower as the engine temperature is higher. Therefore, at a time when the engine temperature is high and the warming-up operation is ended, the responsiveness of the engine speed change with respect to a change of the throttle opening can be improved.

According to the engine controller of claim 9 of the invention, a predetermined value of the intake pressure for detecting the idling state is set on the basis of a detected atmospheric pressure, and, when the intake pressure is equal to or lower than the predetermined value for detecting the idling state when the phase of the crankshaft has a predetermined value, the idling state of the engine is detected. Therefore, the idling state of the engine can be surely detected, and the control can be surely performed in the engine operation state other than the idling state.

According to the engine controller of claim 10 of the invention, as the detected atmospheric pressure is higher, the predetermined value of the intake pressure for detecting the idling state is set to be larger. Therefore the idling state of the engine can be surely detected in accordance with a change of the atmospheric pressure, and the control when the atmospheric pressure is changed can be surely performed in the engine operation state other than the idling state.

According to the engine controller of claim 11 of the invention, the atmospheric pressure is detected on the basis of the detected intake pressure. Therefore, an atmospheric pressure sensor is not required, and the number of parts is correspondingly reduced, so that the cost can be lowered.

According to the engine controller of the invention, when the detected engine speed detected is equal to or lower than an engagement speed of the centrifugal clutch, the idling state of the engine is detected. Therefore, the idling state of the engine can be surely detected.

What is claimed is:

1. An engine controller comprising:
   crankshaft phase detecting means for detecting a phase of a crankshaft;
   intake pressure detecting means for detecting an intake pressure of an intake passage of an engine;
   stroke detecting means for detecting a stroke of said engine on the basis of the phase of said crankshaft detected by said crankshaft phase detecting means, and the intake pressure detected by said intake pressure detecting means; and
   engine controlling means for controlling an operation state of said engine on the basis of the stroke of said engine detected by said stroke detecting means, wherein
   said engine controlling means comprising:
   engine speed detecting means for detecting a speed of said engine;
   idling detecting means for detecting an idling state of said engine;
   target engine speed setting means for, when the idling state of said engine is detected by said idling detecting means, setting a target engine speed; and
   idling ignition timing setting means for, when the idling state of said engine is detected by said idling detecting means, setting an ignition timing in accordance with a difference between the target engine speed set by said target engine speed setting means and the engine speed detected by said engine speed detecting means, wherein when the ignition timing is changed to one of an advancing side and a retarding side, said idling ignition timing setting means avoids continuation of a change of said ignition timing to a same side.

2. The engine controller according to claim 1, wherein said idling ignition timing setting means sets the ignition timing by multiplying an integration value of the difference between the target engine speed set by said target engine speed setting means and the engine speed detected by said engine speed detecting means, with a predetermined gain.

3. The engine controller according to claim 2, wherein when the ignition timing is changed to one of the advancing side and the retarding side, said idling ignition timing setting means sets the ignition timing change setting gain for the same side to a smaller value, the ignition timing change setting gain being multiplied with the integration value of the difference between the target engine speed set by said target engine speed setting means and the engine speed detected by said engine speed detecting means.

4. The engine controller according to claim 3, wherein immediately after start of rotation of said engine, said idling ignition timing setting means sets the gain to a larger value, the gain being multiplied with the integration value of the difference between the target engine speed set by said target engine speed setting means and the engine speed detected by said engine speed detecting means.

5. The engine controller according to claim 4, wherein said apparatus further comprises engine temperature detecting means for detecting a temperature of said engine, and
said idling ignition timing setting means sets the ignition timing at a state change of said engine from a state other than the idling state to the idling state, on the basis of the engine temperature detected by said engine temperature detecting means.

6. The engine controller according claim 5, wherein said apparatus further comprises engine temperature detecting means for detecting a temperature of said engine, and said idling ignition timing setting means sets upper and lower limits of the ignition timing on the basis of the engine temperature detected by said engine temperature detecting means, and restricts the ignition timing by the upper and lower limits.

7. The engine controller according to claim 6, wherein said idling ignition timing setting means sets the upper and lower limits of the ignition timing so that a width between the upper and lower limits is narrower as the engine temperature detected by said engine temperature detecting means is higher.

8. The engine controller according to claim 7, wherein said apparatus further comprises atmospheric pressure detecting means for detecting an atmospheric pressure, and said idling detecting means sets a predetermined value of the intake pressure for detecting the idling state, on the basis of the atmospheric pressure detected by said atmospheric pressure detecting means, and, when the intake pressure detected by said intake pressure detecting means is equal to or lower than the predetermined value for detecting the idling state when the phase of said crankshaft detected by said crankshaft phase detecting means has a predetermined value, detects the idling state of said engine.

9. The engine controller according to claim 8, wherein said idling detecting means sets the predetermined value of the intake pressure for detecting the idling state to be larger as the atmospheric pressure detected by said atmospheric pressure detecting means is higher.

10. The engine controller according to claim 9, wherein said atmospheric pressure detecting means detects the atmospheric pressure on the basis of the intake pressure detected by said intake pressure detecting means.

11. The engine controller according to claim 10, wherein said apparatus further comprises a centrifugal clutch between said engine and a transmission, and when the engine speed detected by said engine speed detecting means is equal to or lower than an engagement speed of said centrifugal clutch, said idling detecting means detects the idling state of said engine.

* * * * *